(12) United States Patent
Wang et al.

(10) Patent No.: US 9,967,539 B2
(45) Date of Patent: May 8, 2018

(54) TIMESTAMP ERROR CORRECTION WITH DOUBLE READOUT FOR THE 3D CAMERA WITH EPIPOLAR LINE LASER POINT SCANNING

(71) Applicant: Samsung Electronics Co., Ltd., Suwon-si, Gyeonggi-do (KR)

(72) Inventors: Yibing Michelle Wang, Temple City, CA (US); Ilia Ovsiannikov, Studio City, CA (US); Gregory Waligorski, Pasadena, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 50 days.

(21) Appl. No.: 15/225,816

(22) Filed: Aug. 1, 2016

(65) Prior Publication Data

US 2017/0353707 A1    Dec. 7, 2017

Related U.S. Application Data

(60) Provisional application No. 62/345,734, filed on Jun. 3, 2016.

(51) Int. Cl.
| | |
|---|---|
| *H04N 9/47* | (2006.01) |
| *H04N 7/18* | (2006.01) |
| *H04N 13/00* | (2018.01) |
| *H04N 5/225* | (2006.01) |
| *H04N 5/376* | (2011.01) |
| *G01C 3/08* | (2006.01) |

(52) U.S. Cl.
CPC ........... *H04N 13/0022* (2013.01); *G01C 3/08* (2013.01); *H04N 5/2253* (2013.01); *H04N 5/2254* (2013.01); *H04N 5/3765* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 8,687,060 B1 * | 4/2014 | Wolff | G06F 3/03543 |
| | | | 250/206.2 |
| 9,661,308 B1 * | 5/2017 | Wang | H04N 13/026 |
| 2010/0302365 A1 | 12/2010 | Finocchio et al. | |

(Continued)

*Primary Examiner* — Talha M Nawaz
(74) *Attorney, Agent, or Firm* — Renaissance IP Law Group LLP

(57) ABSTRACT

A method and a system are disclosed that use a double-readout technique to generate timestamps and grayscale values for pixel-specific outputs of a pixel row in a pixel array in which the pixel array forms an image plane and the row of pixels forms an epipolar line of a scanning line on the image plane. For a pixel-specific output that exceeds a threshold, a timestamp value and a grayscale value are generated and associated with the pixel-specific output. If a pixel-specific output does not exceed the threshold and no timestamp is generated (i.e., a missing timestamp), a grayscale value for the pixel-specific output is generated and associated with the pixel-specific output. Timestamps errors may be corrected that may be caused by missing timestamps, timestamps that are associated with pixel clusters and outlier timestamps, i.e., pixel-specific outputs that are not consistent with a monotonic relationship of timestamp values under normal conditions.

20 Claims, 10 Drawing Sheets

(56) References Cited

U.S. PATENT DOCUMENTS

| | | | |
|---|---|---|---|
| 2012/0131309 A1* | 5/2012 | Johnson | G06F 9/30 |
| | | | 712/41 |
| 2014/0055560 A1 | 2/2014 | Fu et al. | |
| 2015/0100555 A1* | 4/2015 | Tremblay | G06F 17/3007 |
| | | | 707/693 |
| 2015/0294473 A1 | 10/2015 | Michot et al. | |
| 2016/0309135 A1* | 10/2016 | Ovsiannikov | H04N 5/23245 |
| 2016/0309140 A1* | 10/2016 | Wang | H04N 5/374 |
| 2017/0134710 A1* | 5/2017 | Wang | H04N 13/026 |
| 2017/0272726 A1* | 9/2017 | Ovsiannikov | G01C 3/08 |

\* cited by examiner

TIMESTAMP ERROR CORRECTION WITH DOUBLE READOUT FOR THE 3D CAMERA WITH EPIPOLAR LINE LASER POINT SCANNING

CROSS-REFERENCE TO RELATED APPLICATION

This application claims the priority benefit under 35 U.S.C. § 119(e) of U.S. Provisional Application No. 62/345,734 filed on Jun. 3, 2016, the disclosure of which is incorporated herein by reference in its entirety.

TECHNICAL FIELD

The present disclosure generally relates to image sensors. More specifically, and not by way of limitation, particular embodiments of the inventive aspects disclosed in the present disclosure are directed to correction of timestamp errors in a three-dimensional (3D) imaging system or depth sensor that utilizes epipolar geometry-based imaging in conjunction with a laser point scan in a triangulation-based approach to depth measurements on a 3D object.

BACKGROUND

Three-dimensional (3D) imaging systems are increasingly being used in a wide variety of applications such as industrial production, video games, computer graphics, robotic surgeries, consumer displays, surveillance videos, 3D modeling, real estate sales, and so on.

Existing 3D-imaging technologies may include, for example, the time-of-flight (TOF) based range imaging, stereo vision systems, and structured light (SL) methods.

In the TOF method, distance to a 3D object is resolved based on the known speed of light by measuring the round-trip time it takes for a light signal to travel between a camera and the 3D object for each point of the image. A TOF camera may use a scannerless approach to capture the entire scene with each laser or light pulse. Some example applications of the TOF method may include advanced automotive applications such as active pedestrian safety or pre-crash detection based on distance images in real time, to track movements of humans such as during interaction with games on video game consoles, in industrial machine vision to classify objects and help robots find the items such as items on a conveyor belt, and so on.

In stereoscopic imaging or stereo vision systems, two cameras displaced horizontally from one another are used to obtain two differing views on a scene or a 3D object in the scene. By comparing these two images, the relative depth information can be obtained for the 3D object. Stereo vision is highly important in fields such as robotics, to extract information about the relative position of 3D objects in the vicinity of autonomous systems/robots. Other applications for robotics include object recognition in which stereoscopic depth information allows a robotic system to separate occluding image components, which the robot may otherwise not be able to distinguish as two separate objects, such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light, often grids or horizontal bars or patterns of parallel stripes, is projected onto a scene or a 3D object in the scene. The projected pattern may become deformed or displaced when striking the surface of the 3D object. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging maybe used in different applications such as by a police force to photograph fingerprints in a 3D scene, inline inspection of components during a production process, in health care for live measurements of human body shapes or the micro structures of human skin, and the like.

SUMMARY

One embodiment provides a method that comprises performing a one-dimensional point scan of an object along a scanning line using a light source in which the point scan projects a sequence of light spots on a surface of the object; selecting a row of pixels in an image sensor in which the image sensor comprises a plurality of pixels arranged in a two-dimensional array forming an image plane, and the selected row of pixels forms at least a portion of an epipolar line of the scanning line on the image plane; generating at least one pixel-specific output of a pixel in the selected row corresponding to a light spot in the sequence of light spots; generating a timestamp value associated with each pixel-specific output corresponding to the light spot if the pixel-specific output corresponding to the light spot exceeds a predetermined threshold; generating a grayscale value representing a gray-level intensity of each pixel-specific output corresponding to the light spot; determining a timestamp value for the light spot as: the timestamp value that corresponds to a pixel-specific output having the greatest gray-level intensity corresponding to the light spot if more than two pixel-specific outputs correspond to the light spot and at least one pixel-specific output exceeds the predetermined threshold, or a timestamp value that is based on timestamps associated with pixel-specific outputs corresponding to light spots in the sequence of light spots that are neighbors to the light spot if a pixel-specific output corresponds to the light spot and no timestamp or an outlier timestamp was generated for the light spot, and determining a distance to the light spot on the surface of the object based on the determined timestamp value for the light spot and a scan angle used by the light source to project the light spot.

Another embodiment provides an imaging unit that comprises a light source to perform a one-dimensional point scan of an object along a scanning line in which the point scan projects a sequence of light spots on a surface of the object, and an image sensor unit. The image sensor unit comprises a plurality of pixels arranged in a two-dimensional pixel array that forms an image plane in which a row of pixels in the two-dimensional pixel array forms at least a portion of an epipolar line of the scanning line, and each pixel in the row of pixels generates a pixel-specific output corresponding to a light spot in the sequence of light spots. A timestamp generator generates a timestamp value associated with each pixel-specific output corresponding to the light spot if the pixel-specific output exceeds a predetermined threshold. A gray-scale generator generates a grayscale value representing a grey-level intensity of each pixel-specific output corresponding to the light spot. A timestamp determiner determines a timestamp value for the light spot as: the timestamp value that corresponds to a pixel-specific output having the greatest gray-level intensity corresponding to the light spot if more than two pixel-specific outputs correspond to the light spot and at least one pixel-specific output exceeds the predetermined threshold, and a timestamp value that is based timestamps associated with pixel-specific outputs corresponding to light spots in the sequence of light spots that are neighbors to the light spot if a pixel-specific output corresponds to the light spot and no timestamp or an outlier timestamp was generated for the light spot. A distance determiner determines a distance to the light spot on the surface of the object based on the determined timestamp value for the light spot and a scan angle used by the light source to project the light spot. The timestamp determiner further determines the timestamp value for the light spot by determining the timestamp value for the light spot based on interpolating timestamps associated with pixel-specific outputs corresponding to light spots in the sequence of light spots that are neighbors to the light spot if a pixel-specific output corresponds to the light spot and no timestamp or an outlier timestamp was generated for the light spot. The timestamp determiner further determines the timestamp value for the light spot by determining the timestamp value to be the timestamp value associated with pixel-specific output corresponding to the light spot if only one pixel-specific output corresponds to the light spot and the pixel-specific output exceeds the predetermined threshold.

Another embodiment provides an image sensor unit that comprises a two-dimensional pixel array comprising a plurality of rows of pixels that forms an image plane in which at least one row of pixels generates a pixel-specific output corresponding to a light spot in a sequence of light spots projected in a scanning line on to a surface of an object, and in which the at least one row forms at least a portion of an epipolar line of the scanning line. A timestamp generator generates a timestamp value associated with each pixel-specific output corresponding to the light spot if the pixel-specific output exceeds a predetermined threshold. A grayscale generator generates a grayscale value representing a gray-level intensity of each pixel-specific output corresponding to the light spot. A timestamp determiner to determine a timestamp value for the light spot as: the timestamp value associated with pixel-specific output corresponding to the light spot if only one pixel-specific output corresponds to the light spot and the pixel-specific output exceeds the predetermined threshold; the timestamp value that corresponds to a pixel-specific output having the greatest gray-level intensity corresponding to the light spot if more than two pixel-specific outputs correspond to the light spot and at least one pixel-specific output exceeds the predetermined threshold, and a timestamp value that is based timestamps associated with pixel-specific outputs corresponding to light spots in the sequence of light spots that are neighbors to the light spot if a pixel-specific output corresponds to the light spot and no timestamp or an outlier time stamp was generated for the light spot. A distance determiner determines a distance to the light spot on the surface of the object based on the determined timestamp value for the light spot and a scan angle used by the light source to project the light spot. The timestamp determiner further determines the timestamp value for the light spot if a single pixel-specific output corresponds to the light spot and no timestamp or an outlier timestamp was generated for the light spot by determining the timestamp value for the light spot based on interpolating timestamps associated with pixel-specific outputs corresponding to light spots in the sequence of light spots that are neighbors to the light spot.

BRIEF DESCRIPTION OF THE DRAWINGS

In the following section, the inventive aspects of the present disclosure will be described with reference to exemplary embodiments illustrated in the figures, in which.

DETAILED DESCRIPTION

Figure 1:
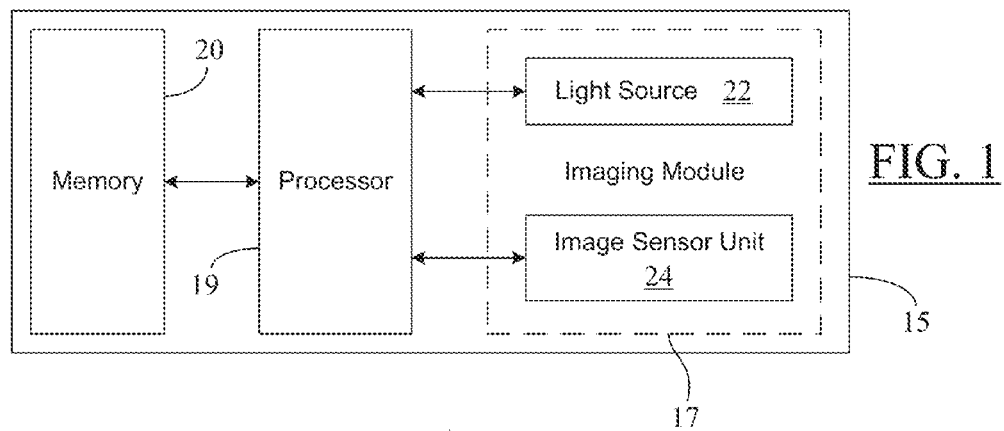
FIG. 1 shows a highly simplified, partial layout of a system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail to not obscure the present disclosure. Additionally, the described inventive aspects can be implemented to perform low power, 3D-depth measurements in any imaging device or system, including, for example, a smartphone, a User Equipment (UE), a laptop computer, and the like.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "two-dimensional," "pre-determined," "pixel-specific," etc.) may be occasionally interchangeably used with its non-hyphenated version (e.g., "two dimensional," "predetermined," "pixel specific," etc.), and a capitalized entry (e.g., "Counter Clock," "Row Select," "PIXOUT," etc.) may be interchangeably used with its non-capitalized version (e.g., "counter clock," "row select," "pixout," etc.). Such occasional interchangeable uses shall not be considered inconsistent with each other.

It is noted at the outset that the terms "coupled," "operatively coupled," "connected," "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. However, such usage is for simplicity of illustration and ease of discussion only; it does not imply that the construction or architectural details of such components or units are the same across all embodiments or such commonly-referenced parts/modules are the only way to implement the teachings of particular embodiments of the present disclosure. As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth It is observed here that the earlier-mentioned 3D technologies have a number of drawbacks. For example, a TOF-based 3D imaging system may require high power to operate optical or electrical shutters. Hence, a TOF system may not be desirable for cell phone-based camera applications in which low power consumption is a critical requirement. A TOF sensor may also require special pixels with big pixel sizes, usually larger than 7 µm, which may cause a reduced sensor resolution. These pixels also may be vulnerable to ambient light.

The stereoscopic imaging approach generally works only with textured surfaces and in good illumination conditions. Furthermore, stereo imaging requires two regular, high bit-resolution sensors along with two lenses, making the entire assembly unsuitable for applications in portable devices, like cell phones or tablets in which device real estate is at a premium.

Legacy SL approaches can be vulnerable to elevated levels of ambient light, especially in outdoor conditions. Thus, a structured light-based system may not be suitable for consumer image sensors in smartphones.

SL and TOF 3D technologies can be enhanced to simultaneously capture a color image in addition to the 3D image, for example, by adding a separate color sensor into the camera capable of capturing both color and 3D image using a single sensor.

In contrast to the above-mentioned 3D technologies, particular embodiments of the present disclosure provide for implementing a low power, 3D imaging system capable of working in a wide range of conditions, including both strong ambient light and poor illumination, on portable, compact electronic devices such as smartphones, tablets, UEs, and the like, while capturing both depth and color image using only one image sensor. A 2D imaging sensor as per particular embodiments of the present disclosure can capture both 2D RGB (Red, Green, Blue) color images and 3D-depth measurements with visible light laser scanning. It is noted here that although the following discussion may frequently mention the visible light laser as a light source for point-scans and a 2D RGB sensor as an image/light capture device, such mention is for the purpose of illustration and consistency of discussion only. The visible laser and RGB sensor based examples discussed below may find applications in low-power, consumer-grade mobile electronic devices with cameras such as smartphones, tablets, or UEs. However, it is understood that the teachings of the present disclosure are not limited to the visible laser-RGB sensor based examples mentioned below. Rather, according to particular embodiments of the present disclosure, the point scan-based 3D-depth measurements may be performed using many different combinations of 2D sensors and laser light sources (for point scans) such as: (i) a 2D color (RGB) sensor with a visible light laser source, in which the laser source may be a red (R), green (G), or blue (B) light laser, or a laser source producing a combination of these lights; (ii) a visible light laser with a 2D RGB color sensor having an Infrared (IR) cut filter; (iii) a Near Infrared (NIR) laser with a 2D NIR sensor; (iv) an NIR laser with a 2D RGB sensor (without an IR cut filter); (v) a 2D RGBW (red, green, blue, white) sensor with either visible or NIR laser; and so on.

During 3D-depth measurements, the entire sensor may operate as a timestamping sensor in conjunction with the laser scan to reconstruct 3D content. In particular embodiments, the pixel size of the sensor can be as small as 1 µm. Furthermore, due to lower bit-resolution, the image sensor according to particular embodiments of the present disclosure may require significantly much lower processing power than that is needed for high bit-resolution sensors in traditional 3D-imaging systems. Because of the need for less processing power and small component dimensions, the 3D imaging module according to present disclosure may require low system power and, hence, may be quite suitable for inclusion in low power devices like smartphones.

In particular embodiments, the present disclosure uses SL-like triangulation and point scans with a laser light source for 3D-depth measurements with a sensor's pixel rows functioning as a collection of line sensors. The laser scanning plane and the imaging plane are oriented using epipolar geometry, such that each horizontal laser scan is imaged by a certain sensor row. An image sensor according to one embodiment of the present disclosure may use timestamps to remove ambiguity in the triangulation approach, thereby reducing the amount of depth computations and system power. The same image sensor, that is, each pixel in the image sensor, may be used in the normal 2D (RGB color or non-RGB) imaging mode as well as in the 3D laser scan mode to substantially concurrently capture both color and depth images. Furthermore, the point scan approach utilizes very short laser exposure time, thus effectively eliminating motion-induced blur and counteracting strong ambient illumination while keeping the total exposure low and eye-safe, and may allow the system to take depth measurements effectively interleaved with the color capture, thereby reducing the latency for depth measurements versus the color capture.

As noted before, in particular embodiments, the entire image sensor may be used for routine 2D RGB color imaging using, for example, ambient light, as well as for 3D-depth imaging using visible laser scan. Such dual use of the same camera unit may save space and cost for mobile devices. Furthermore, in certain applications, the user of visible laser for 3D applications may be better for a user's eye safety as compared to a Near Infrared (NIR) laser. The sensor may have higher quantum efficiency at visible spectrum that at the NIR spectrum, leading to lower power consumption of the light source.

FIG. 1 shows a highly simplified, partial layout of a system 15 according to one embodiment of the present disclosure. As shown, the system 15 may include an imaging module 17 coupled to and in communication with a processor or host 19. The system 15 may also include a memory module 20 coupled to the processor 19 to store information content, such as image data received from the imaging module 17. In particular embodiments, parts of the entire system 15 may be encapsulated in a single Integrated Circuit (IC) or chip. Alternatively, each of the modules 17, 19, and 20 may be implemented in a separate chip. Furthermore, the memory module 20 may include more than one memory chip, and the processor module 19 may comprise of multiple processing chips as well. In any event, the details about packaging of the modules in FIG. 1 and how the modules are fabricated or implemented, whether in a single chip or using multiple discrete chips, are not relevant to the present discussion and, hence, such details are not provided herein.

The system 15 may be any low-power electronic device configured for 2D and 3D camera applications as described in the present disclosure. The system 15 may be portable or non-portable. Some examples of the portable version of the system 15 may include popular consumer electronic gadgets such as, but not limited to, a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. On the other hand, some examples of the non-portable version of the system 15 may include, but are not limited to, a game console in a video arcade, an interactive video terminal, an automobile, a machine vision system, an industrial robot, a VR equipment, a driver-side mounted camera in a car (for example, to monitor whether the driver is awake or not), and so on. The 3D imaging functionality provided as described in the present disclosure may be used in many applications such as, but not limited to, virtual reality applications on a virtual reality equipment, online chatting/gaming, 3D texting, searching an online or local (device-based) catalog/database using a 3D image of a product to obtain information related to the product (for example, calorie content of a piece of food item), robotics and machine vision applications, automobile applications, such as autonomous driving applications, and the like.

In particular embodiments of the present disclosure, the imaging module 17 may include a light source 22 and an image sensor unit 24. As discussed in more detail with reference to FIG. 2 below, in one embodiment, the light source 22 may be a visible laser. In other embodiments, the light source may be an NIR laser. The image sensor unit 24 may include a pixel array and ancillary processing circuits as shown in FIG. 2 and also discussed below.

In one embodiment, the processor 19 may be a CPU, which can be a general-purpose microprocessor. In the discussion herein, the terms "processor" and "CPU" may be used interchangeably for ease of discussion. However, it is understood that, instead of or in addition to the CPU, the processor 19 may contain any other type of processors such as, but not limited to, a microcontroller, a Digital Signal Processor (DSP), a Graphics Processing Unit (GPU), a dedicated Application Specific Integrated Circuit (ASIC) processor, and the like. Furthermore, in one embodiment, the processor/host 19 may include more than one CPU, which may be operative in a distributed processing environment. The processor 19 may be configured to execute instructions and to process data according to a particular Instruction Set Architecture (ISA) such as an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having other functionalities in addition to a CPU functionality.

In particular embodiments, the memory module 20 may be a Dynamic Random Access Memory (DRAM) such as a Synchronous DRAM (SDRAM), or a DRAM-based Three Dimensional Stack (3DS) memory module, such as a High Bandwidth Memory (HBM) module, or a Hybrid Memory Cube (HMC) memory module. In other embodiments, the memory module 20 may be a Solid-State Drive (SSD), a non-3DS DRAM module, or any other semiconductor-based storage system such as a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
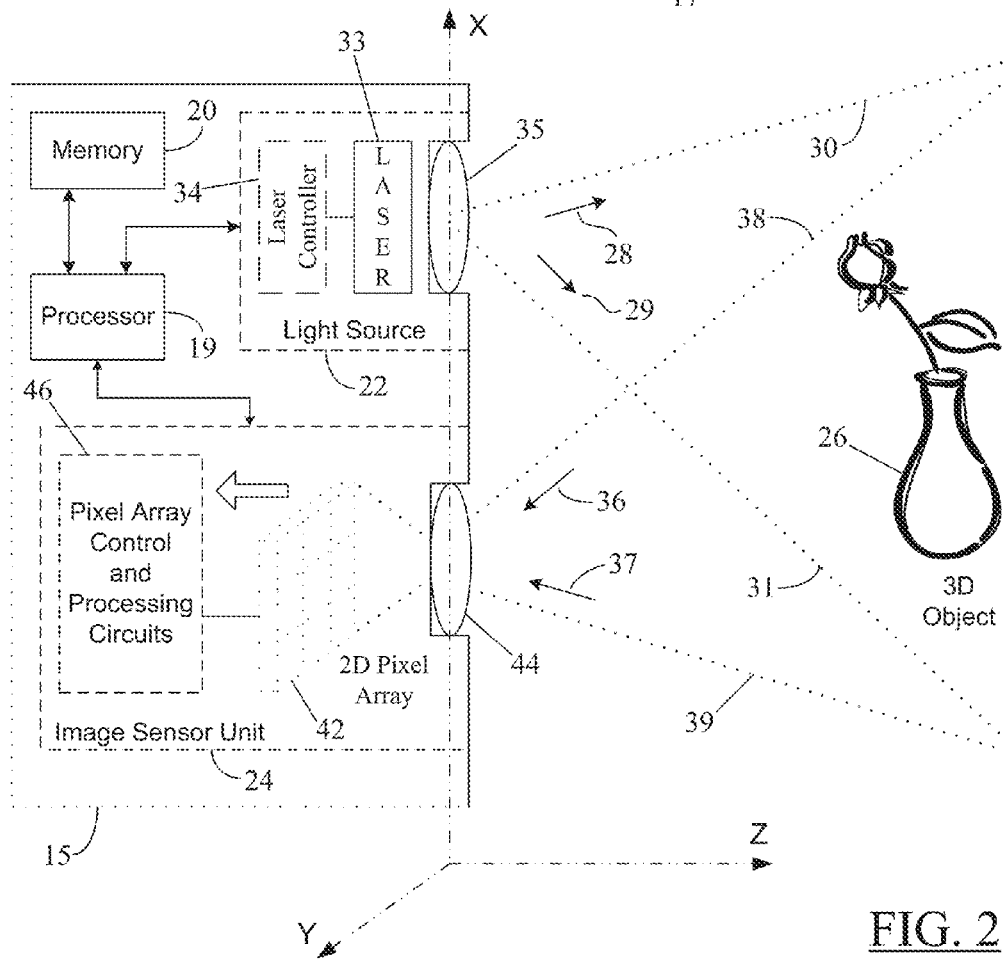
FIG. 2 illustrates an exemplary operational layout of the system in FIG. 1 according to one embodiment of the present disclosure.

FIG. 2 illustrates an exemplary operational layout of the system 15 in FIG. 1 according to one embodiment of the present disclosure. The system 15 may be used to obtain depth information (along the Z-axis) for a 3D object, such as the 3D object 26, which may be an individual object or an object within a scene (not shown). In one embodiment, the depth information may be calculated by the processor 19 based on the scan data received from the image sensor unit 24. In another embodiment, the depth information may be calculated by the image sensor unit 24 itself, such as in case of the image sensor unit in the embodiment of FIG. 7A. In particular embodiments, the depth information may be used by the processor 19 as part of a 3D user interface to enable the user of the system 15 to interact with the 3D image of the object or use the 3D image of the object as part of games or other applications running on the system 15. The 3D imaging as per teachings of the present disclosure may be used for other purposes or applications as well, and may be applied to substantially any scene or 3D objects.

In FIG. 2, the X-axis is taken to be the horizontal direction along the front of the device 15, the Y-axis is the vertical direction (out of the page in this view), and the Z-axis extends away from the device 15 in the general direction of the object 26 being imaged. For the depth measurements, the optical axes of the modules 22 and 24 may be parallel to the Z-axis. Other optical arrangements may be used as well to implement the principles described herein, and these alternative arrangements are considered to be within the scope of the present disclosure.

The light source module 22 may illuminate the 3D object 26 as shown by exemplary arrows 28-29 associated with corresponding dotted lines 30-31 representing an illumination path of a light beam or optical radiation that may be used to point scan the 3D object 26 within an optical field of view. A line-by-line point scan of the object surface may be performed using an optical radiation source, which, in one embodiment, may be a laser light source 33 operated and controlled by a laser controller 34. The laser source 33 and components of the controller 34 may be securely-mounted within an enclosure or housing (not shown) that is part of the module 22. A light beam from the laser source 33 may be point scanned under the control of the laser controller 34 in the X-Y direction across the surface of the 3D object 26 via projection optics 35. The point scan may project light spots on the surface of the 3D object along a scan line, as discussed in more detail with reference to FIGS. 4 and 5 below. The projection optics may be a focusing lens, a glass/plastics surface, or other cylindrical optical element that concentrates laser beam from the laser 33 as a point or spot on that surface of the object 26. In the embodiment of FIG. 2, a convex structure is shown as a focusing lens 35. However, any other suitable lens design may be selected for projection optics 35. The object 26 may be placed at a focusing location where illuminating light from the light source 33 is focused by the projection optics 35 as a light spot. Thus, in the point scan, a point or narrow area/spot on the surface of the 3D object 26 may be illuminated sequentially by the focused light beam from the projection optics 35.

In particular embodiments, the light source (or illumination source) 33 may be a diode laser or a Light Emitting Diode (LED) emitting visible light, an NIR laser, a point light source, a monochromatic illumination source (such as a combination of a white lamp and a monochromator) in the visible light spectrum, or any other type of laser light source. The laser 33 may be fixed in one position within the housing of the device 15, but may be rotatable in X-Y directions. The laser 33 may be X-Y addressable (for example, by the laser controller 34) to perform point scan of the 3D object 26. In one embodiment, the visible light may be substantially green light. The visible light illumination from the laser source 33 may be projected onto the surface of the 3D object 26 using a mirror (not shown), or the point scan may be completely mirror-less. In particular embodiments, the light source module 22 may include more or less components than those shown in the exemplary embodiment of FIG. 2.

In the embodiment of FIG. 2, the light reflected from the point scan of the object 26 may travel along a collection path indicated by arrows 36-37 and dotted lines 38-39. The light collection path may carry photons reflected from or scattered by the surface of the object 26 upon receiving illumination from the laser source 33. It is noted here that the depiction of various propagation paths using solid arrows and dotted lines in FIG. 2 (and also in FIGS. 4 and 5, as applicable) is for illustrative purpose only. The depiction should not be construed to illustrate any actual optical signal propagation paths. In practice, the illumination and collection signal paths may be different from those shown in FIG. 2, and may not be as clearly-defined as in the illustration in FIG. 2.

The light received from the illuminated object 26 may be focused onto one or more pixels of a 2D pixel array 42 via collection optics 44 in the image sensor unit 24. Like the projection optics 35, the collection optics 44 may be a focusing lens, a glass/plastics surface, or other optical element that concentrates the reflected light received from the object 26 onto one or more pixels in the 2D array 42. In the embodiment of FIG. 2, a convex structure is shown as a focusing lens 44. However, any other suitable lens design may be selected for collection optics 44. Furthermore, for ease of illustration only a 3×3 pixel array is shown in FIG. 2 (and also in FIG. 6). However, it is understood that, modern pixel arrays contain millions or even tens of millions of pixels. The pixel array 42 may be an RGB pixel array, in which different pixels may collect light signals of different colors. As mentioned before, in particular embodiments, the pixel array 42 may be any 2D sensor such as, but not limited to, a 2D RGB sensor with IR cut filter, a 2D NIR sensor, a 2D RGBW sensor, a 2D RWB (Red, White, Blue) sensor, a multi-layer Complementary Metal-Oxide Semiconductor (CMOS) organic sensor, a 2D RGB-IR sensor, and the like. As discussed in more detail later, the system 15 may use the same pixel array 42 for 2D RGB color imaging of the object 26 (or a scene containing the object) as well as for 3D imaging (involving depth measurements) of the object 26. Additional architectural details of the pixel array 42 are discussed later with reference to FIG. 6.

Figure 7A:
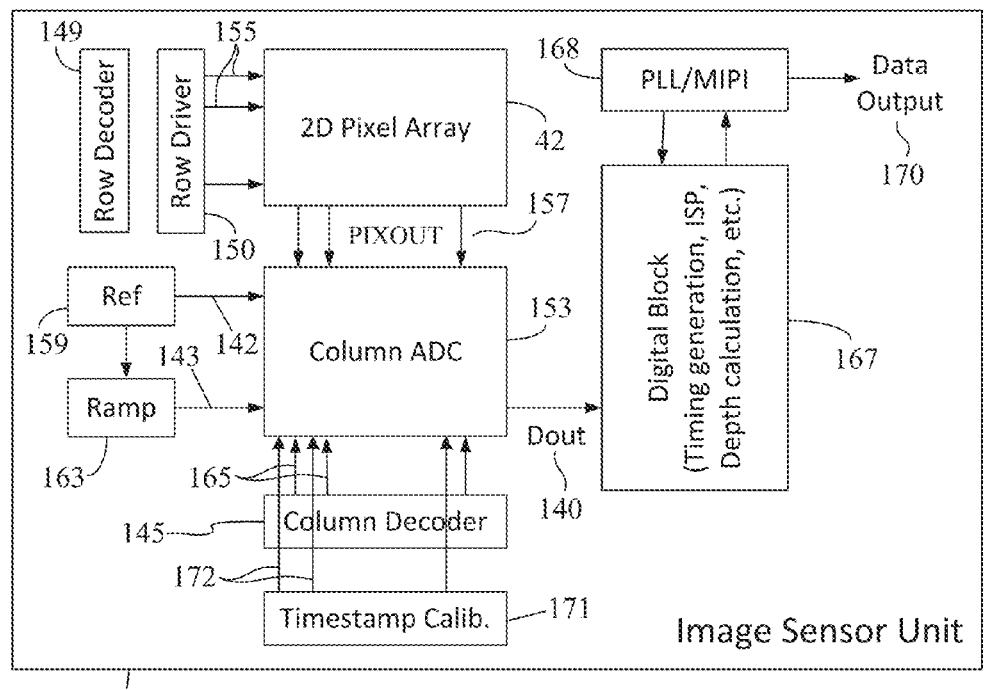
FIG. 7A is an exemplary layout of an image sensor unit according to one embodiment of the present disclosure.
Figure 7B:
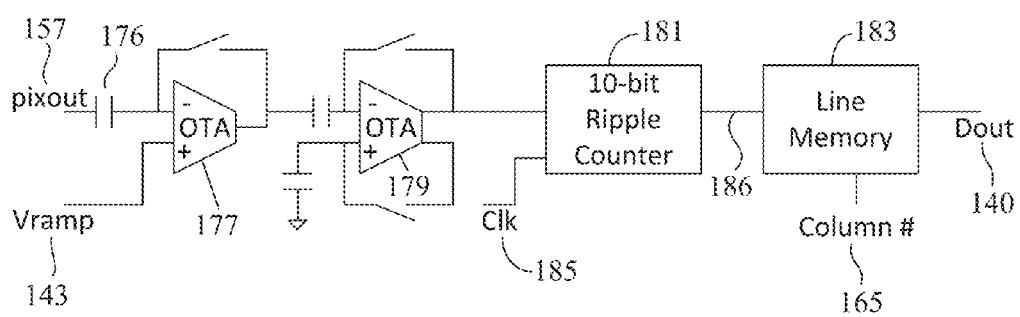
FIG. 7B shows architectural details of an exemplary CDS+ADC unit for 3D-depth measurement according to one embodiment of the present disclosure.

The pixel array 42 may convert the received photons into corresponding electrical signals, which are then processed by the associated image processing unit 46 to determine the 3D-depth image of the object 26. In one embodiment, the image processing unit 46 may use triangulation for depth measurements. The triangulation approach is discussed later with reference to FIG. 4. The image processing unit 46 may also include relevant circuits for controlling the operation of the pixel array 42. Exemplary image processing and control circuits are illustrated in FIGS. 7A and 7B, which are discussed later below.

The processor 19 may control the operations of the light source module 22 and the image sensor unit 24. For example, the system 15 may have a mode switch (not shown) controllable by the user to switch from 2D-only imaging mode to 2D- and 3D-imaging mode. When the user selects the 2D-imaging mode using the mode switch, the processor 19 may activate the image sensor unit 24, but may not activate the light source module 22 because 2D imaging may use ambient light. On the other hand, when the user selects 2D- and 3D-imaging using the mode switch, the processor 19 may activate both of the modules 22, 24 (as discussed below). The processed image data received from the image processing unit 46 may be stored by the processor 19 in the memory 20. The processor 19 may also display the user-selected 2D or 3D image on a display screen (not shown) of the device 15. The processor 19 may be programmed in software or firmware to carry out various processing tasks described herein. Alternatively or additionally, the processor 19 may comprise programmable hardware logic circuits for carrying out some or all of its functions. In particular embodiments, the memory 20 may store program code, look-up tables, and/or interim computational results to enable the processor 19 to carry out its functions.

Figure 3:
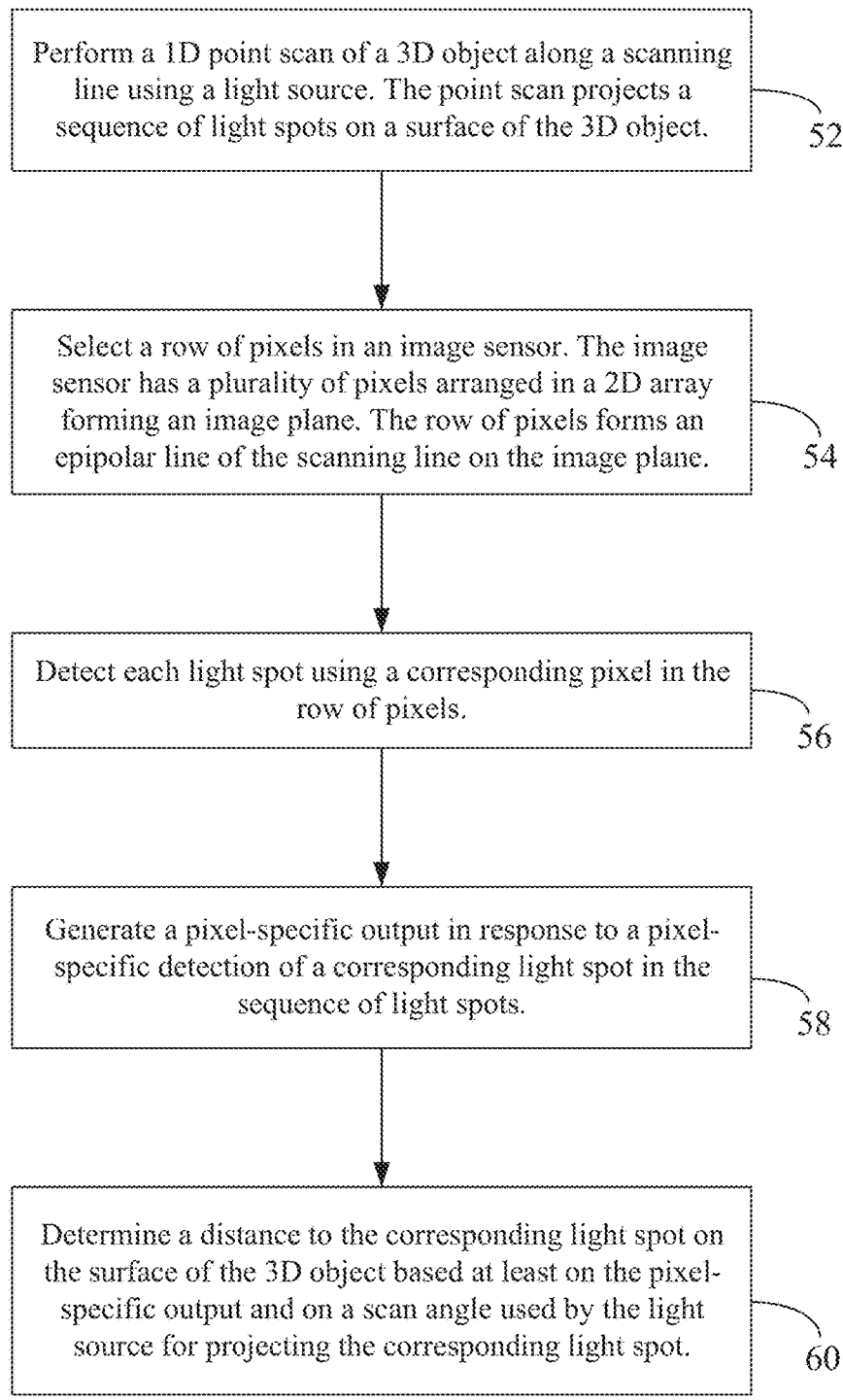
FIG. 3 depicts an exemplary flowchart showing how 3D-depth measurements may be performed according to one embodiment of the present disclosure.

FIG. 3 depicts an exemplary flowchart 50 showing how 3D-depth measurements may be performed according to one embodiment of the present disclosure. Various steps illustrated in FIG. 3 may be performed by a single module or a combination of modules or system components in the system 15. In the discussion herein, by way of an example only, specific tasks are described as being performed by specific modules or system components. Other modules or system components may be suitably configured to perform such tasks as well.

In FIG. 3, at block 52, the system 15 (more specifically, the processor 19) may perform a one-dimensional (1D) point scan of a 3D object, such as the object 26 in FIG. 2, along a scanning line using a light source, such as the light source module 22 in FIG. 2. As part of the point scan, the light source module 22 may be configured, for example, by the processor 19, to project a sequence of light spots on a surface of the 3D object 26 in a line-by-line manner. At block 54, the pixel processing unit 46 in the system 15 may select a row of pixels in an image sensor, such as the 2D pixel array 42 in FIG. 2. The image sensor 42 has a plurality of pixels arranged in a 2D array forming an image plane, and, in one embodiment, the selected row of pixels forms an epipolar line of the scanning line (at block 52) on the image plane. A brief discussion of epipolar geometry is provided below with reference to FIG. 4. At block 56, the pixel processing unit 46 may be operatively configured by the processor 19 to detect each light spot using a corresponding pixel in the row of pixels. It is observed here that light reflected from an illuminated light spot may be detected by a single pixel or more than one pixel such as when the light reflected from the illuminated spot gets focused by the collection optics 44 onto two or more adjacent pixels. On the other hand, it may be possible that light reflected from two or more light spots may be collected at a single pixel in the 2D array 42. The timestamp-based approach discussed below resolves the so-called correspondence problem by tracking which laser spot was imaged by which pixel. At block 58, the image processing unit 46, as suitably configured by the processor 19, may generate a pixel-specific output in response to a pixel-specific detection (at block 56) of a corresponding light spot in the sequence of light spots (in the point scan at block 52). Consequently, at block 60, the image processing unit 46 may determine the 3D distance (or depth) to the corresponding light spot on the surface of the 3D object based at least on the pixel-specific output (at block 58) and on a scan angle used by the light source for projecting the corresponding light spot (at block 52). The depth measurement is discussed in more detail with reference to FIG. 4.

Figure 4:
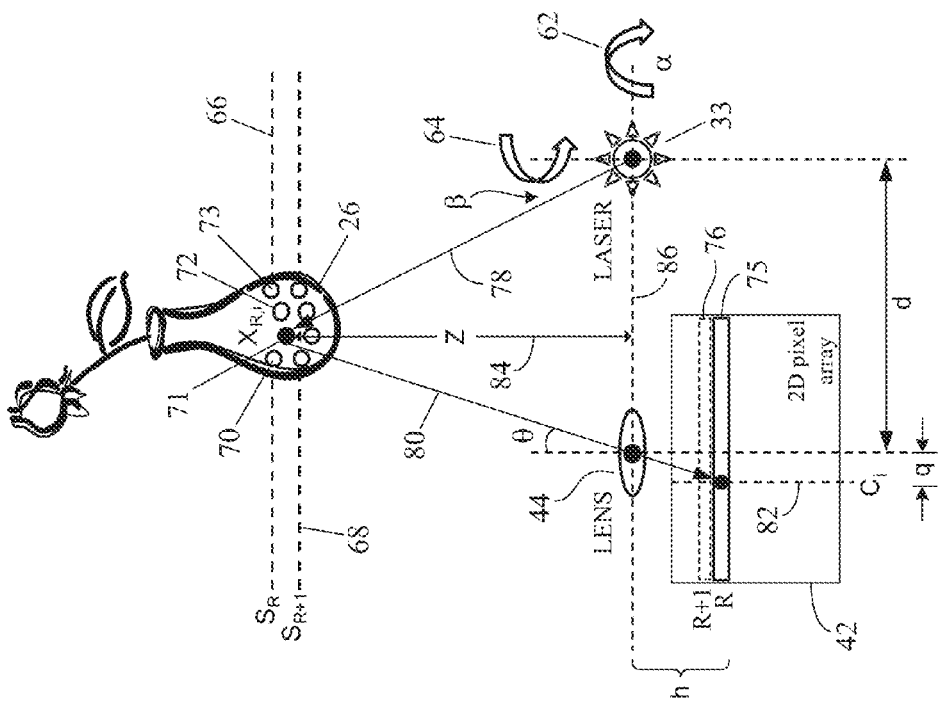
FIG. 4 is an exemplary illustration of how a point scan may be performed for 3D-depth measurements according to one embodiment of the present disclosure.

FIG. 4 is an exemplary illustration of how a point scan may be performed for 3D-depth measurements according to one embodiment of the present disclosure. In FIG. 4, the X-Y rotational capabilities of the laser source 33 are illustrated using the arrows 62, 64 depicting the angular motions of the laser in the X-direction (having "yaw" angle "$\beta$") and in the Y-direction (having "pitch" or "elevation" angle "$\alpha$"). In one embodiment, the laser controller 34 may control the X-Y rotation of the laser source 33 based on scanning instructions/input received from the processor 19. For example, when the user selects the 3D-imaging mode, the processor 19 may instruct the laser controller 34 to initiate 3D-depth measurements of the object surface facing the projection optics 35. In response, the laser controller 34 may initiate a series of 1D point scans of the object surface through X-Y movement of the laser light source 33. As shown in FIG. 4, the laser 33 may point scan the surface of the object 26 by projecting light spots along 1D horizontal scanning lines, two of which $S_R$ 66 and $S_{R+1}$ 68 are identified by dotted lines in FIG. 4. Because of the curvature of the surface of the object 26, the light spots 70-73 may form the scanning line $S_R$ 66 in FIG. 4. For ease of illustration and clarity, the light spots constituting the scan line $S_{R+1}$ 68 are not identified using reference numerals. The laser 33 may scan the object 26 along rows R, R+1, and so on, one spot at a time, for example, in the left-to-right direction. The values of "R," "R+1," and so on, are with reference to rows of pixels in the 2D pixel array 42 and, hence, these values are known. For example, in the 2D pixel array 42 in FIG. 4, the pixel row "R" is identified using reference numeral "75" and the row "R+1" is identified using reference numeral "76." It is understood that rows "R" and "R+1" are selected from the plurality of rows of pixels for illustrative purpose only.

The plane containing the rows of pixels in the 2D pixel array 42 may be called the image plane, whereas a plane containing a scanning line and a corresponding row of pixels imaging that scanning line, like the line $S_R$ and row R or line $S_{R+1}$ and row R+1, may be called a scanning plane. In the embodiment of FIG. 4, the image plane and each scanning plane are oriented using epipolar geometry such that each row of pixels R, R+1, and so on, in the 2D pixel array 42 forms an epipolar line of the corresponding scanning line $S_R$, $S_{R+1}$, and so on. A row of pixels R may be considered epipolar to a corresponding scanning line $S_R$ when a projection of an illuminated spot (in the scanning line) onto the image plane may form a distinct spot along a line that is the row R itself. For example, in FIG. 4, the arrow 78 illustrates the illumination of the light spot 71 along scan line $S_R$ by the laser 33, whereas the arrow 80 shows that the light spot 71 is being imaged or projected along the row R 75 by the focusing lens 44. Although not shown in FIG. 4, it is observed that all of the light spots 70-73 from scan line $S_R$ will be imaged by corresponding pixels in the row R. Thus, in one embodiment, the physical arrangement, such as the position and orientation, of the laser 33 and the pixel array 42 may be such that illuminated light spots in a scanning line on the surface of the object 26 may be captured or detected by pixels in a corresponding row in the pixel array 42 in which that row of pixels thus forms an epipolar line of the corresponding scanning line. Although not shown in FIG. 4, it is observed here that, in one embodiment, a scanning line, such as the scanning line $S_R$, may not be perfectly straight, but may be curved or slanted. Such not-so-perfect laser scan lines may result, for example, if there is a misalignment between the laser 33 and the pixel array 42. The misalignment may be due to limitations on mechanical/physical tolerances of various parts assembled in the system 15 or due to any discrepancy in the arrangement or final assembly of these parts. In the case of a slightly curved/slanted scanning line, two or more substantially-adjacent rows of pixels (in the pixel array 42) may collectively capture an epipolar line of the curved scanning line. In other words, in particular embodiments, a single row of pixels may only form a portion of the epipolar line. In any event, the teachings of the present disclosure remain applicable regardless of whether a single row or a substantially small group of substantially adjacent rows of pixels in the image plane forms an epipolar line of a corresponding scanning line. However, for ease of explanation and without the loss of generality, the discussion below may primarily refer to the configuration in which a single row of pixels forms an entire epipolar line.

It is understood that the pixels in the 2D pixel array 42 may be arranged in rows and columns. An illuminated light spot may be referenced by its corresponding row and column in the pixel array 42. For example, in FIG. 4, the light spot 71 in the scanning line $S_R$ is designated as $X_{R,i}$ to indicate that the spot 71 may be imaged by row R and column i ($C_i$) in the pixel array 42. The column $C_i$ is indicated by dotted line 82. Other illuminated spots may be similarly identified.

In the illustration of FIG. 4, the arrow having reference numeral 84 represents the depth or distance Z (along the Z-axis) of the light spot 71 from the X-axis along the front of the device 15, such as the X-axis shown in FIG. 2. In FIG. 4, a dotted line having the reference numeral 86 represents such axis, which may be visualized as being contained in a vertical plane that also contains the projection optics 35 and the collection optics 44. However, for ease of explanation of the triangulation method, the laser source 33 is shown in FIG. 4 as being on the X-axis 86 instead of the projection optics 35. In a triangulation-based approach, the value of Z may be determined using the following equation:

$$Z = \frac{hd}{q - h\tan\beta} \quad (1)$$

The parameters mentioned in the above Equation (1) are also shown in FIG. 4. Based on the physical configuration of the device 15, the values for the parameters on the right-hand side of Equation (1) may be pre-determined. In Equation (1), parameter h is the "focal distance" (along the Z-axis) between the collection optics 44 and the image sensor (which is assumed to be in a vertical plane behind the collection optics 44); parameter d is the "base offset" distance between the light source 33 and the collection optics 44 associated with the image sensor 24; parameter q is the offset distance between the collection optics 44 and a pixel that detects the corresponding light spot, in this case the detecting/imaging pixel "i" is represented by column $C_i$ associated with the light spot $X_{R,i}$ 71; and parameter β is the scan yaw angle or beam yaw angle of the light source in the scan plane for the light spot under consideration, in this case the light spot 71. Alternatively, parameter q may also be considered as the offset of the light spot within the field of view of the pixel array 42. The angle θ in FIG. 4 is the incidence angle of reflected light (with respect to vertical direction) corresponding to the light spot 71.

It is seen from Equation (1) that only parameters β and q are variable for a given point scan; the other parameters h and d are essentially fixed due to the physical geometry of the device 15. Because row R 75 is at least a portion of an epipolar line of the scanning line $S_R$, the depth difference or depth profile of the object 26 may be reflected by the image shift in the horizontal direction, as represented by the values of the parameter q for different lights spots being imaged. As discussed later below, the time-stamp based approach according to particular embodiments of the present disclosure may be used to find the correspondence between the pixel location of a captured light spot and the corresponding scan angle of the laser source 33. In other words, a time-stamp may represent an association between the values of parameters q and β. Thus, from the known value of the laser angle β and the corresponding location of the imaged light spot (as represented by the parameter q), the distance to that light spot may be determined using the triangulation Equation (1).

Figure 5:
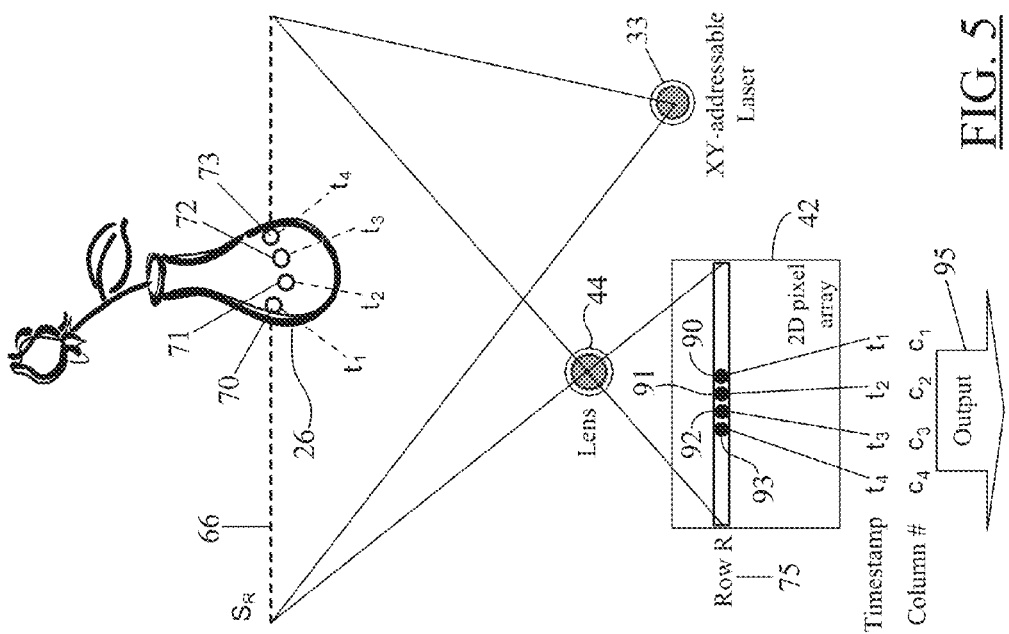
FIG. 5 illustrates an exemplary time-stamping for scanned light spots according to one embodiment of the present disclosure.

FIG. 5 illustrates an exemplary time-stamping for scanned light spots according to one embodiment of the present disclosure. Additional details of generation of individual timestamps are provided later such as with reference to discussion of FIG. 8. In contrast to FIG. 4, in the embodiment of FIG. 5, the collection optics 44 and the laser 33 are shown in an offset arrangement to reflect the actual physical geometry of these components as shown in the embodiment of FIG. 2. By way of an example, the scanning line 66 is shown in FIG. 5 along with corresponding light spots 70-73, which, as mentioned before, may be projected based on a left-to-right point scan of the object surface by the sparse laser point source 33. Thus, as shown, the first light spot 70 may be projected at time instant $t_1$, the second light spot 71 may be projected at time instant $t_2$, and so on. These light spots may be detected/imaged by respective pixels 90-93 in pixel row "R" 75, which is an epipolar line of the scanning line $S_R$ as discussed earlier. In one embodiment, the charge collected by each pixel when detecting a light spot may be in the form of an analog voltage, which may be used to generate the corresponding timestamp to be output to the image processing unit 46 for pixel-specific depth determination as discussed below. The generated timestamps are collectively indicated by arrow 95 in FIG. 5.

As shown in FIG. 5, each detecting pixel 90-93 in row R may have an associated column number, in this case, columns $C_1$ through $C_4$. Furthermore, it is seen from FIG. 4 that each pixel column $C_i$ (i=1, 2, 3, and so on) has an associated value for the parameter q in Equation (1). Thus, when a pixel-specific timestamp $t_1$-$t_4$ is generated for the detecting pixels 90-93 (as discussed in more detail later below), the timestamp may provide an indication of the pixel's column number and, hence, the pixel-specific value of the parameter q. Additionally, in one embodiment, the spot-by-spot detection using pixels in the pixel array 42 may allow the image processing unit 46 to "link" each timestamp with the corresponding illuminated spot and, hence, with the spot-specific scan angle β because the laser 33 may be suitably controlled to illuminate each spot in the desired sequence with pre-determined values for spot-specific scan angles θ. Thus, timestamps provide correspondence between the pixel location of a captured laser spot and its respective scan angle in the form of the values for parameters q and β in Equation (1) for each pixel-specific signal received from the pixel array 42. As discussed before, the values of the scan angle and the corresponding location of the detected spot in the pixel array 42, as reflected through the value of the parameter q in Equation (1), may allow depth determination for that light spot. In this manner, the 3D-depth map for the surface of the object 26 in the field of view of the pixel array 42 may be generated.

Figure 6:
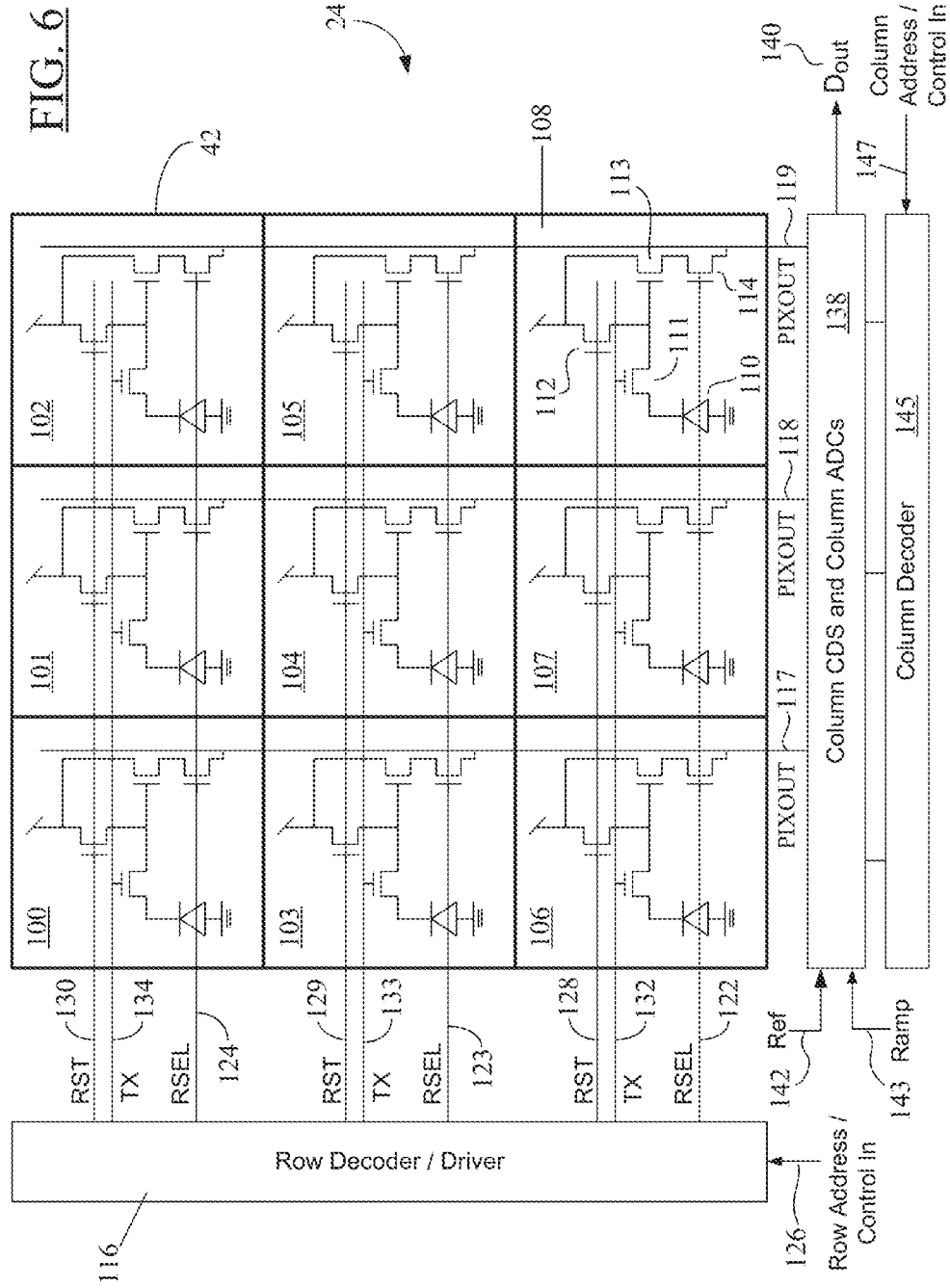
FIG. 6 shows exemplary circuit details of the 2D pixel array and a portion of the associated processing circuits in the image processing unit of the image sensor in FIGS. 1 and 2 according to one embodiment of the present disclosure.

FIG. 6 shows exemplary circuit details of the 2D pixel array 42 and a portion of the associated processing circuits in the image processing unit 46 of the image sensor 24 in FIGS. 1 and 2 according to one embodiment of the present disclosure. As noted before, the pixel array 42 is shown having nine pixels 100-108 arranged as a 3×3 array for ease of illustration only; in practice, a pixel array may contain hundreds of thousands or millions of pixels in multiple rows and columns. In one embodiment, each pixel 100-108 may have an identical configuration as shown in FIG. 6. In the embodiment of FIG. 6, the 2D pixel array 42 is a Complementary Metal Oxide Semiconductor (CMOS) array in which each pixel is a Four Transistor Pinned Photo-diode (4T PPD) pixel. For ease of illustration, the constituent circuit elements of only pixel 108 are labeled with reference numerals. The following discussion of the operation of the pixel 108 equally applies to the other pixels 101-107 and, hence, the operation of each individual pixel is not described herein.

As shown, the 4T PPD pixel 108 (and similar other pixels 101-107) may comprise a pinned photo-diode (PPD) 110 and four N-channel Metal Oxide Semiconductor Field Effect Transistors (NMOS) 111-114 connected as illustrated. In some embodiments, the pixels 100-108 may be formed of P-channel Metal Oxide Semiconductor Field Effect Transistors (PMOS) or other different types of charge transfer devices. The transistor 111 may operate as a Transfer Gate (TG), Floating Diffusion (FD) transistor. Broadly, the 4T PPD pixel 108 may operate as follows: First, the PPD 110 may convert the incident photons into electrons, thereby converting the optical input signal into an electrical signal in the charge domain. Then, the transfer gate 111 may be "closed" to transfer all the photon-generated electrons from the PPD 110 to the floating diffusion. The signal in the charge domain thus gets converted to the voltage domain for ease of subsequent processing and measurements. The voltage at the floating diffusion may be later transferred as a pixout signal to an Analog-to-Digital Converter (ADC) using the transistor 114 and converted into an appropriate digital signal for subsequent processing. More details of the pixel output (PIXOUT) generation and processing are provided below with reference to discussion of FIG. 8.

In the embodiment of FIG. 6, a row decoder/driver 116 in the image processing unit 46 is shown to provide three different signals to control the operation of the pixels in the pixel array 42 to generate the column-specific pixout signals 117-119. In the embodiment of FIG. 5, the output 95 may collectively represent such PIXOUT signals 117-119. A Row Select (RSEL) signal may be asserted to select an appropriate row of pixels. In one embodiment, the row to be selected is the epipolar line of the current scanning line (of light spots) being projected by the laser source 33. The row decoder/driver 116 may receive the address or control information for the row to be selected via the row address/control inputs 126, for example, from the processor 19. In the present discussion, it is assumed that the row decoder/driver 116 selects the row of pixels containing the pixel 108. A transistor, such as the transistor 114, in each row of pixels in the pixel array 42 may be connected to a respective RSEL line 122-124 as shown. A Reset (RST) signal may be applied to pixels in the selected row to reset those pixels to a pre-determined high voltage level. Each row-specific RST signal 128-130 is shown in FIG. 6 and explained in more detail with reference to the waveforms in FIG. 8. A transistor, such as the transistor 112, in each pixel may receive the respective RST signal as shown. A Transfer (TX) signal may be asserted to initiate transfer of the pixel-specific output voltage (PIXOUT) for subsequent processing. Each row-specific TX line 132-134 is shown in FIG. 6. A transfer-gate transistor, such as the transistor 111, may receive the respective TX signal as illustrated in FIG. 6.

As mentioned before, in particular embodiments of the present disclosure, the 2D array 42 and the rest of the rest of the components in the image sensor unit 24 may be used for 2D RGB (or non-RGB) imaging as well as for 3D-depth measurements. Consequently, as shown in FIG. 6, the image sensor unit 24 may include a pixel column unit 138 that includes circuits for Correlated Double Sampling (CDS) as well as column-specific ADCs (i.e., one ADC per column of pixels) to be used during 2D and 3D imaging. The pixel column unit 138 may receive the PIXOUT signals 117-119 and process them to generate a digital data output (Dout) signal 140 from which 2D image may be generated or 3D-depth measurements can be obtained. The pixel column unit 138 may also receive a reference input 142 and a ramp input 143 during processing of the PIXOUT signals 117-119. More details of the operation of the unit 138 are provided later below. In the embodiment of FIG. 6, a column decoder unit 145 is shown coupled to the pixel column unit 138. The column decoder 145 may receive a column address/control input 147, for example, from the processor 19, for the column to be selected in conjunction with a given row select (RSEL) signal. The column selection may be sequential, thereby allowing sequential reception of the pixel output from each pixel in the row selected by the corresponding RSEL signal. The processor 19 may be aware of the currently-projected scanning line of light spots and, hence, may provide appropriate row address inputs to select the row of pixels that forms the epipolar line of the current scanning line and may also provide appropriate column address inputs to enable the pixel column unit 138 to receive outputs from the individual pixels in the selected row.

It is observed here that although the discussion herein primarily focuses on the 4T PPD pixel design shown in FIG. 6 for 2D and 3D imaging according to teachings of the present disclosure, different types of pixels may be used in the pixel array 42 in other embodiments. For example, in one embodiment, each pixel in the pixel array 42 may be a 3T pixel, which omits the transfer gate transistor, like the transistor 111 in the 4T PPD design in FIG. 6. In other embodiments, 1T pixels or 2T pixels may be used as well. In yet another embodiment, each pixel in the pixel array 42 may have a shared-transistor pixel configuration in which transistors and read-out circuitry can be shared among two or more neighboring pixels. In the shared-transistor pixel configuration, each pixel may have at least one photo-diode and one transfer-gate transistor; and the rest of the transistors can be shared among two or more pixels. One example of such a shared-transistor pixel is the 2-shared (1×2) 2.5T pixel in which five transistors (T) are used for two pixels, resulting in a 2.5T/pixel configuration. Another example of a shared-transistor pixel that may be used in the pixel array 42 is the 1×4 4-shared pixel, in which 4 pixels share the readout circuitry, but each one has at least one photo-diode and one TX (transfer-gate) transistor. Other pixel configurations than those listed here may be suitably implemented for 2D and 3D imaging as per teachings of the present disclosure.

FIG. 7A is an exemplary layout of an image sensor unit, such as the image sensor unit 24 in FIG. 6, according to one embodiment of the present disclosure. For the sake of brevity, only a brief discussion of the architecture in FIG. 7A is provided herein; more operational details are provided later with reference to FIGS. 8, 10 and 11. In the embodiment of FIG. 7A, various component blocks other than the 2D pixel array 42 may form a part of the pixel control unit 46 in FIG. 2. As shown, the image sensor unit 24 in FIG. 7A may include a row decoder unit 149 and a row driver unit 150, both of which collectively comprise the row decoder/driver 116 in FIG. 6. Although not shown in FIG. 7A, the row decoder unit 149 may receive a row address input (like the input 126 shown in FIG. 6), for example, from the processor 19, and decode the input to enable the row driver unit 150 to provide appropriate RSEL, RST and TX signals to the row selected/decoded by the row decoder 149. The row driver unit 150 may also receive control signals (not shown), for example, from the processor 19, to configure the row driver 150 to apply appropriate voltage levels for the RSEL, RST and TX signals. In the image sensor 24 in FIG. 7A, a column ADC unit 153 may represent the pixel column unit 138 in FIG. 6. For ease of illustration, in FIG. 7A, various row-specific driver signals, such as the RSEL, RST and TX signals, from the row driver 150 are collectively referenced using a single reference numeral 155. Similarly, all column-specific pixel outputs (pixouts), like the pixouts 117-119 in FIG. 6, are collectively referenced using a single reference numeral 157. The column ADC unit 153 may receive the pixout signals 157 and the reference input 142 (from a reference signal generator 159) and the ramp signal 143 to generate a pixel-specific output by the corresponding column-specific ADC for the pixel's column. The 3D imaging is discussed in more detail later with reference to FIG. 8. In one embodiment, the ADC unit 153 may include circuitry for CDS, as in case of the pixel column unit 138 in FIG. 6, to generate a CDS output (not shown) that is the difference between the reset level of the pixel and the received signal level. In particular embodiments, the 3D-depth values may be combined with the 2D image to generate a 3D image of the object.

The column ADC unit 153 may include a separate ADC per pixel column in the 2D array 42. Each column-specific ADC may receive a respective ramp input 143 (from a ramp signal generator 163) along with the pixout signals 157. In one embodiment, the ramp signal generator 163 may generate the ramp input 143 based on the reference voltage level received from the reference signal generator 159. Each column-specific ADC in the ADC unit 153 may process the received inputs to generate the corresponding digital data output (Dout) signal 140. From the column decoder 145, the ADC unit 153 may receive information about which column ADC output to be readout and sent to the Dout bus 140, and may also receive information about which column to select for a given row to receive the appropriate pixel output. Although not shown in FIG. 7A, the column decoder unit 145 may receive a column address input (like the input 147 in FIG. 6), for example, from the processor 19, and decode the input to enable the column ADC unit 153 to select the appropriate pixel column. In the embodiment of FIG. 7A, the decoded column address signals are collectively identified using the reference numeral "165."

The digital data outputs 140 from the ADC units may be processed by a digital processing block 167. In one embodiment, for the 2D RGB imaging mode, each ADC-specific data output 140 may be a multi-bit digital value that substantially corresponds to the actual photon charge collected by the respective pixel. On the other hand, in the 3D-depth measurement mode, each ADC-specific data output 140 may be a timestamp value representing the time instant when the respective pixel detects its corresponding light spot. This timestamping approach according to the present disclosure is discussed later in more detail. The digital processing block 167 may include circuits to provide timing generation; Image Signal Processing (ISP) such as processing of data outputs 140 for the 2D imaging mode; depth calculations for the 3D imaging mode; and so on. In that regard, the digital processing block 167 may be coupled to an interface unit 168 to provide the processed data as an output 170, for example, to enable the processor 19 to render a 2D RGB/non-RGB image or a 3D-depth image of the 3D object 26 on a display screen (not shown) of the device 15. The interface unit 168 may include a Phase-Locked Loop (PLL) unit for generation of clock signals that support the timing generation functionality in the digital processing block 167. Furthermore, the interface unit 168 may also include a Mobile Industry Processor Interface (MIPI) that provides an industry-standard hardware and software interface to other components or circuit elements in the device 15 for the data generated by the digital block 167. The MIPI specifications support a broad range of mobile products and provide specifications for a mobile device camera, display screen, power management, battery interface, and the like. The MIPI-standardized interfaces may yield an improved operability between a mobile device's peripherals, such as a smartphone's camera or display screen, and the application processor(s) of the mobile device, which may not be from the same vendor as the vendor (or vendors) providing the peripherals.

In the embodiment of FIG. 7A, a timestamp calibration unit 171 is shown coupled to the column ADC unit 153 to provide appropriate calibration signals 172 to individual column-specific ADCs to enable each column-specific ADC unit to generate an output representing a pixel-specific timestamp value in the 3D measurement mode. Although not shown in FIG. 7A, it is understood that, in particular embodiments, the calibration unit 171 may be coupled to the digital block 167 as well for timestamp calibration related processing support. The timestamping approach and related errors are discussed in more detail with reference to FIGS. 8-11.

FIG. 7B shows architectural details of an exemplary CDS+ADC unit 175 for 3D-depth measurement according to one embodiment of the present disclosure. For ease of discussion, the unit 175 may be referred below to as an "ADC unit," however, it is understood that the unit 175 may also include CDS functionality in addition to the ADC functionality. In FIG. 7B, the capacitor 176 represents a simplified version of a CDS unit. In one embodiment, each column of pixels in the 2D pixel array 42 may have a column-specific, single slope ADC unit that is similar to the ADC unit 175. In other words, each pixel in a given column may share the same ADC unit, like the ADC unit 175. Thus, in the embodiment of FIG. 6, there may be three ADC units in the pixel column unit 138 (i.e., one ADC per column). In particular embodiments, the column-specific ADC units 175 may be part of the column ADC unit 153 in FIG. 7A. As shown, the ADC 175 in the embodiment of FIG. 7B may include two Operational Transconductance Amplifiers (OTA) 177, 179, connected in series with a binary counter 181 and a line memory unit 183. For ease of illustration, only the inverting (−) and non-inverting (+) voltage inputs to the OTAs 177, 179 are shown in FIG. 7B; the biasing inputs and the power supply connections are not shown. It is understood that an OTA is an amplifier whose differential input voltage produces an output current. Thus, an OTA may be considered as a voltage-controlled current source. The biasing inputs may be used to provide currents or voltages to control the amplifier's transconductance. The first OTA 177 may receive from the CDS unit 176 a CDS version of the pixout voltage from a pixel, such as the pixel 108 in FIG. 6, that is selected in the activated row using the column number received from the column decoder 145. The CDS version of a pixout signal may be referred to as a "PIX_CDS" signal. The OTA 177 may also receive a Vramp voltage 143 from the ramp signal generator 163 (FIG. 7A). The OTA 177 may generate an output current when the pixout voltage 157 drops below the Vramp voltage 143, as discussed below with reference to FIG. 8. The output of the OTA 177 may be filtered by the second OTA 179 before being applied to the binary counter 181. In one embodiment, the binary counter 181 may be a 10-bit ripple counter that receives a Clock (Clk) input 185 and generates a timestamp value 186 based on the clock cycles counted during a pre-determined time triggered by the generation of the output current by the first OTA 177. In the context of the embodiment in FIG. 7B, the Clk input 185 may be a system-wide clock or an image sensor-specific clock generated by the PLL unit 168 or other clock generator (not shown) in the device 15. The pixel-specific timestamp value 186 may be stored in the line memory 183 against the column number (column #) of the pixel, and subsequently output to the digital processing block 167 as the Dout signal 140. The column number input 165 may be received from the column decoder unit 145 shown in FIG. 7A.

In particular embodiments, the RGB color model may be used for sensing, representation, and display of images on mobile devices such as the device 15 in FIGS. 1 and 2. In the RGB color model, the light signals having three primary colors (i.e., red, green, and blue) may be added together in various ways to produce a broad array of colors in the final image. The CDS method may be used in 2D RGB imaging to measure an electrical value, such as a pixel/sensor output voltage, in a manner that allows removal of an undesired offset. For example, a CDS unit, like the CDS unit 176, may be employed in each column-specific ADC unit, like the ADC unit 175, to perform correlated double sampling. In CDS, the output of the pixel may be measured twice. That is, measured once in a known condition, and measured once in an unknown condition. The value measured from the known condition may be then subtracted from the value measured from the unknown condition to generate a value with a known relation to the physical quantity being measured, in this case the photoelectron charge representing the pixel-specific portion of the image signal. Using CDS, noise may be reduced by removing the reference voltage of the pixel (such as the pixel's voltage after it is reset) from the signal voltage of the pixel at the end of each integration period. Thus, in CDS, before the charge of a pixel is transferred as an output, the reset value is sampled. The reference value is "deducted" from the value after the charge of the pixel is transferred.

It is observed here that, in particular embodiments, the ADC unit 175 may be used for both 2D imaging as well as 3D-depth measurements. All the inputs for such shared configuration, however, are not shown in FIG. 7B. In the shared use case, the corresponding Vramp signal may be different as well for 2D imaging.

Figure 8:
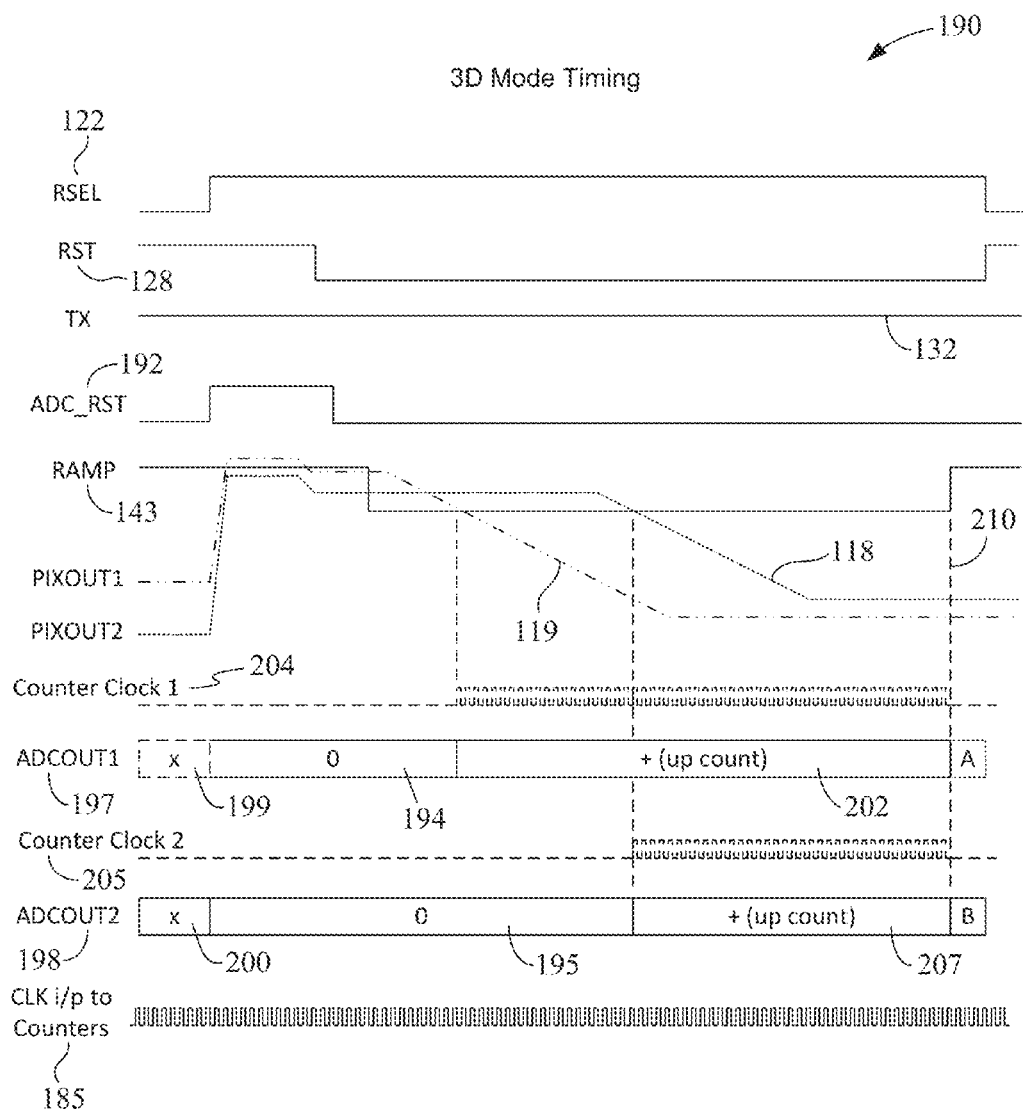
FIG. 8 is a timing diagram that shows exemplary timing of different signals in the system of FIGS. 1 and 2 to generate timestamp-based pixel-specific outputs in a 3D mode of operation according to particular embodiments of the present disclosure.

FIG. 8 is a timing diagram 190 that shows exemplary timing of different signals in the system 15 of FIGS. 1 and 2 to generate timestamp-based pixel-specific outputs in a 3D mode of operation according to particular embodiments of the present disclosure. As noted before, in particular embodiments, all pixels in the same image sensor 24 may be used for 2D as well as 3D imaging.

Briefly, as discussed earlier with reference to FIGS. 4 and 5, the 3D object 26 may be point-scanned one spot at a time by the laser light source 33 along a row R 75 of the pixel array 42, in which R is known based on its epipolar relation with the scanning line $S_R$ 66. After scanning one row, the scanning operation repeats with another row. When the laser projects the next spot, the earlier-projected light spot may be imaged by the corresponding pixel in row R. The pixel-specific outputs from all the pixels in row R may be read out to the depth processing circuit/module in the digital processing block 167 (FIG. 7A).

Figure 11:
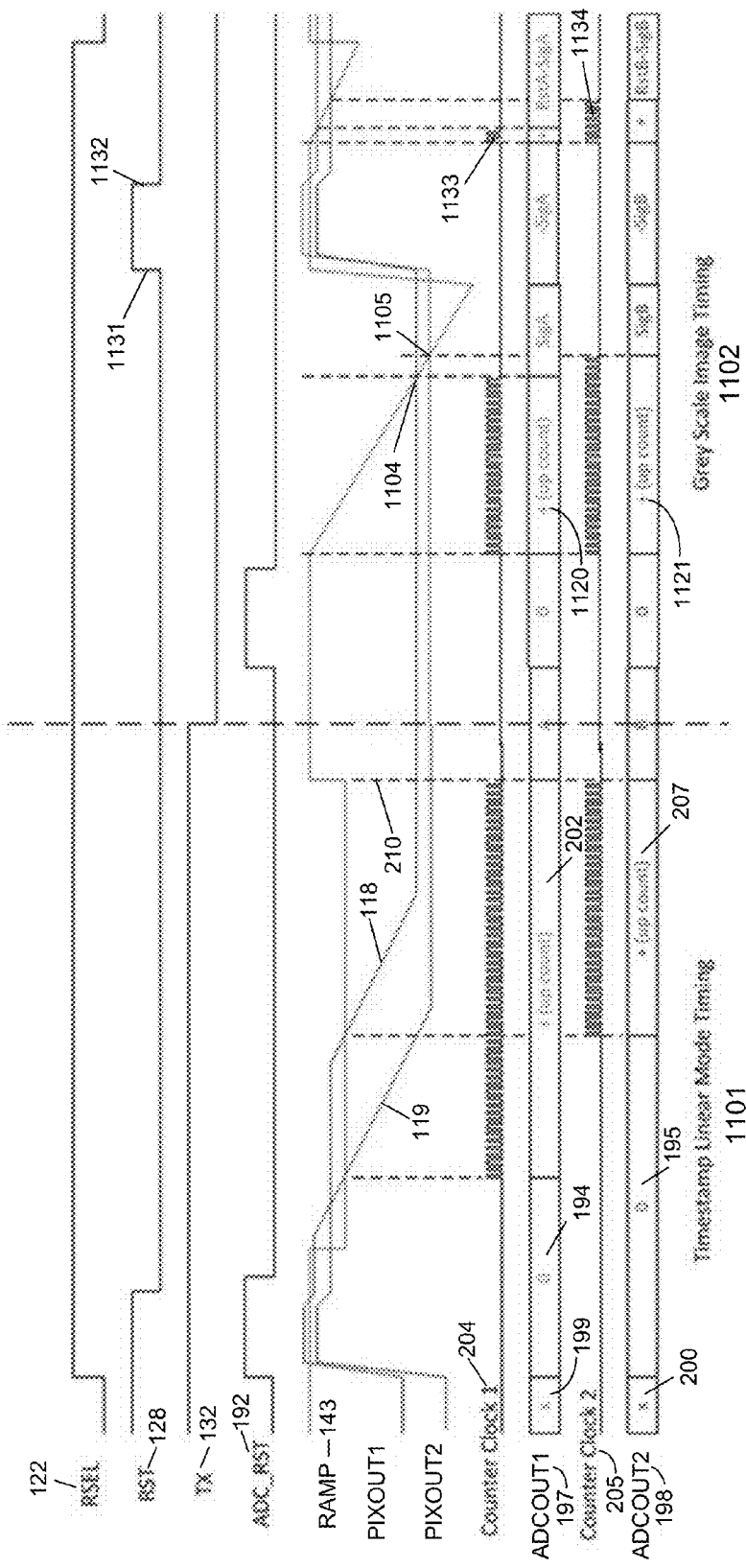
FIG. 11 depicts a timing diagram that shows exemplary timing of different signals for a double-readout technique that may be used in, for example, the system 15 of FIGS. 1 and 2 according to the subject matter disclosed herein.

To generate a pixel-specific output, the corresponding row may have to be initially selected using an RSEL signal. In the context of FIG. 8, it is assumed that the row decoder/driver 116 in FIG. 6 selects the row of pixels containing pixels 106-108 (FIG. 6) by asserting the RSEL signal 122 to a "high" level as shown in FIG. 8. Thus, all the pixels 106-108 are selected together. For ease of discussion, the same reference numerals are used in FIG. 8 for the signals, inputs, or outputs that are also shown in FIGS. 6-7. Initially, all the pixels 106-108 in the selected row may be reset to a high voltage using the RST line 128. The "reset" level of a pixel may represent an absence of the pixel-specific detection of a corresponding light spot. In the 3D mode according to one embodiment of the present disclosure, the RST signal 128 may be released from its high level for a pre-determined time to facilitate integration of photoelectrons received by the pixels 106-108s to obtain the corresponding pixel output (pixout) signals 117-119, two of which (PIXOUT1 and PIXOUT2) are shown in FIG. 8 and discussed later below. The PIXOUT1 signal 119 represents the output supplied to a corresponding ADC unit by the pixel 108, and is shown in FIG. 8 using a dashed line having the pattern "- •• -•• -." The PIXOUT2 signal 118 represents the output supplied to a corresponding ADC unit by the pixel 107, and is shown in FIG. 8 using a dashed line having the pattern "••••••••••••••" It is noted here that, in one embodiment, other RST lines, like the lines 129-130 in FIG. 6, may remain high or "on" for unselected rows to prevent blooming. It is noted here that, strictly speaking, the PIXOUT signals 118-119 in FIG. 8 (and similar pixout signals in FIG. 11) may be slightly modified by a CDS unit, such as the CDS unit 176 in FIG. 7B, before being applied as PIX_CDS signals to the first OTA, like the OTA 177 in FIG. 7B in a respective column-specific ADC unit, such as the ADC unit 175 in FIG. 7B. However, for the simplicity of illustration and ease of discussion, the PIXOUT signals in FIGS. 8 and 11 are treated as representatives of respective PIX_CDS signals (not shown) and are considered as having been directly "input" to the respective OTAs 177.

After reset, when a photodiode in a pixel receives incident luminance, such as the photoelectrons in the light reflected from a light spot projected on the surface of the 3D object 26, the photodiode may generate corresponding photocurrent. A detection of incident light by a pixel may be called an "ON event," whereas a decrease in the intensity of incident light may produce an "OFF event." The photocurrent generated in response to an ON event may decrease the pixel output voltage (PIXOUT) from its initial reset level. A pixel thus functions as a transducer to convert received luminance/light signal into a corresponding electrical (analog) voltage, which is generally designated as a PIXOUT signal in FIGS. 6-8 and 11. Each pixel may be read individually and may be read in the sequence in which the corresponding light spots are projected by the laser source. The analog pixout signal may be converted to a digital value by the corresponding column ADC. In the 2D-imaging mode, the ADC may function as an analog-to-digital converter and generate a multi-bit output. However, as discussed below, in the 3D-depth measurement mode, the ADC may function as a time-to-digital converter (TDC) and generate a timestamp value representing the time when a light spot is detected by a pixel.

Referring again to FIG. 8, after the pixel reset is done (with RST 128 high), the column ADCs associated with pixels 106-108 may be reset as well before the RST is released. However, the transfer (TX) signal 132 may remain high throughout. The ADCs may be reset using either a common ADC reset signal or individual ADC-specific reset signals. In the embodiment of FIG. 8, a common ADC_RST signal 192 is shown to have been briefly asserted (to a high level) to reset the column-specific ADCs, like the ADC 175, in the column ADC unit 153 (FIG. 7A). In one embodiment, the ADCs may be reset to a pre-determined binary value—such as a binary "0" or other known number after the pixels are reset. In FIG. 8, these reset values for ADCs associated with pixels 108 and 107 are respectively shown by "fields" 194-195 in the signals ADCOUT1 (or ADC output "A") and ADCOUT2 (or ADC output "B"). It is noted here that the term "field" is used here for the sake of convenience only when discussing the ADC outputs shown in FIG. 8. It is understood that an ADC output may not actually consist of all of such "fields" at the same time, but may be a specific digital value depending on the current stage of signal processing of the ADC. If the ADC is reset, its output may be a binary "0." If the ADC is triggered to count clock pulses, its output may be a count value as in case of the 3D-depth measurements in FIG. 8; or if the ADC is used for 2D-color imaging, then its output may be a multi-bit value representing an image signal. Thus, the ADC output signals in FIG. 8 are depicted with such "fields" merely to illustrate different digital values an ADC may internally generate in progressing toward the final output. In FIG. 8, the reference numeral 197 is used to refer to the ADCOUT1 signal representing the output of the ADC associated with the pixel 108, and the reference numeral 198 is used to refer to the ADCOUT2 signal representing the output of the ADC associated with the pixel 107. Each of the outputs 197-198 may appear as the Dout signal 140 (FIGS. 6-7) when the respective ADC is selected by the column decoder during memory readout. Prior to being reset, the ADC outputs 197-198 may have unknown values, as indicated by the notation "x" in the fields 199-200.

After ADCs are reset, a pre-determined threshold value may be enabled by de-asserting the ramp input (Vramp) 143 to a pre-defined voltage level after the pixel reset signal 128 and ADC reset signal 192 are released. In the embodiment of FIG. 8, the RAMP input 143 is common to all column-specific ADCs, thereby providing the same Vramp voltage to each ADC. However, in other embodiments, different Vramp values may be applied to two or more ADCs through separate, ADC-specific ramp inputs. Furthermore, in particular embodiments, the Vramp threshold may be a programmable parameter, allowing it to be variable as desired. After the threshold (RAMP signal) is enabled, the pixel-specific ADCs may wait for the corresponding pixel's "ON event" before starting their binary counters, like the counter 181 in FIG. 7B.

In the 3D-depth measurement mode, each ADC may generate a single bit output (representing binary "0" or "1"), as opposed to a multi-bit output in case of the 2D imaging mode. Thus, in case of an RGB sensor, any color information received by a pixel in the RGB pixel array 42 may be effectively ignored in the 3D mode. In the absence of any incident light detected by a pixel, the corresponding ADCOUT signal may remain at the binary "0" value. Thus, columns without any ON events may continue to have digital value "0" (or other known number) for their respective ADCOUT signals. However, as noted before, when a pixel is hit with incident light, its PIXOUT line may start to droop from its reset level, as indicated by the downward slopes of the PIXOUT1 and PIXOUT2 signals in FIG. 8. Assuming that pixel charge is read starting with the pixel that receives the charge first, such a reading may start with the right-most pixel in a row and end with the left-most pixel as shown, for example, in FIG. 5, in which $t_1$ is the earliest time instant and $t_4$ is the latest one. Thus, in the embodiment of FIG. 8, the output of the pixel 108 (PIXOUT1) may be read before that of the pixel 107 (PIXOUT2). As soon as the progressively-drooping PIXOUT1 reaches the Vramp threshold 143, the single-bit ADCOUT1 may flip from binary "0" to binary "1." However, instead of outputting the bit "1," the corresponding ADC may record the time when the bit flips (from "0" to "1"). In other words, the ADC associated with the pixel 108 may function as a time-to-digital converter, by starting the binary counter in the ADC, as indicated by the "up count" field 202 in ADCOUT1. During the "up count" period, the counter in the ADC may count the clock pulses in the CLK signal 185, which may be applied to each ADC as shown, for example, in FIG. 7B. The counted clock pulses are shown by the Counter Clock-1 signal 204 in FIG. 8, and the counted value (in the "up count" field) may be provided as a pixel-specific output for the pixel 108. A similar counting may occur at the ADC associated with pixel 107 for the charge collected by the pixel 107, as indicated by the Counter Clock-2 signal 205 in FIG. 8. The pixel-specific counted value (in the "up count" field 207) may be provided by the respective ADC as a pixel-specific output for the pixel 107. After scanning all pixels in one row, the pixel-by-pixel charge collection operation may repeat with another row, while the outputs from the earlier-scanned row are read out to the depth calculation unit in the digital block 167.

Each ADC output may effectively represent a respective timestamp value providing a temporal indication of a detection by a pixel of a light spot on the object surface illuminated by the laser light source 33. A "timestamp" may be considered to capture the light arrival time for a pixel. In one embodiment, a timestamp value may be generated for a detected light spot by the digital processing block 167 from the count value (of the counted clock pulses) received from an ADC unit. For example, the digital block 167 may generate a timestamp by relating the count value to an internal system time or other reference time. The timestamp is generated at the receiving end and, hence, may not necessarily represent the exact time when the corresponding light spot was projected by the light source. However, the timestamp values may allow the digital block 167 to establish a one-to-one temporal correspondence among each time-stamped light spot and the pixel that imaged that light spot, thereby allowing the digital block 167 to determine distances to time-stamped light spots in the time-wise order specified by the temporal correspondence. That is, the distance to the earliest illuminated light spot being determined first, and so on, until the distance to the last-illuminated light spot is determined. In one embodiment, the timestamping approach may also facilitate resolution of the ambiguity that may arise from multiple pixels detecting a common light spot, as discussed later.

All ADC-based counters may stop simultaneously, such as when the ramp signal 143 is asserted again after a pre-determined time period has elapsed. In FIG. 8, the transition of the ramp signal 143 marking the conclusion of the pre-determined time period for pixel charge integration is indicated by dotted line 210. The RSEL 122 and the RST 128 signals may also transition their states substantially simultaneously with the change in the level of the ramp signal 143 (at line 210). It is observed here that, in one embodiment, all ADC-based counters may be reset at line 210. In another embodiment, all ADC-based counters may be reset at any time prior to the selection of the next row of pixels for reading the pixel charge. Despite resetting of ADC counters upon conclusion of scanning of pixels in one row, the timestamp value for each pixel in the pixel array 42 may remain distinct because of the relational establishment of the timestamp value against an internal system time or other reference source of time, which may remain global and continuously-running.

It is observed here that, in the embodiment of FIG. 8, a later-scanned pixel, such as the pixel 107, may have a smaller ADC output than the pixel that is scanned earlier, such as the pixel 108. Thus, as shown, the ADCOUT2 may have less count value (or less number of clock pulses counted) than the ADCOUT1. Alternatively, in another embodiment, a later-scanned pixel may have a larger ADC output than an earlier-scanned pixel, for example, when each ADC-specific counter starts counting when a pixel is reset and stops counting when an "ON event" is detected, such as when the pixout signal of a pixel droops below a given threshold (Vramp).

It is noted here that circuits and waveforms shown in FIGS. 6-8 and 11 are based on single-slope ADCs with per column up-counters. However, it is understood that the time-stamping approach may be implemented with up- or down-counters depending on the design choice. Furthermore, single slope ADCs with global counters may be used as well. For example, in one embodiment, instead of using individual, column-based counters, a global counter (not shown) may be shared by all column ADCs. In that case, the ADCs may be configured such that the column memory, like the line memory 183 in FIG. 7B, in each ADC may latch the output of the global counter to generate an appropriate ADC-specific output when a column-based comparator unit (not shown) detects an "ON event" such as when it first senses the respective pixout signal drooping below the ramp threshold 143.

It is observed here that, when a row of light spots is scanned along the surface of the object, two or more different spots from the object scanned may be imaged on the same pixel. The spots may be in the same scanning line or may be on adjacent scanning lines. When multiple spots are detected by the same pixel, only one of them may be detected and time-stamped whereas others may be ignored, which may negatively affect the depth profile of the object. Furthermore, it is seen from Equation (1) that the depth measurement is related to the scan angle β and the pixel location of the imaged light spot, as given by the parameter q in Equation (1). Thus, if the scan angle is not correctly known for a given light spot, the depth calculation may be inaccurate. Similarly, if two or more light spots have the same value of q, the depth calculations may become ambiguous as well. The time-stamp based approach may be used to maintain the correct correspondence between the pixel location of a captured light spot and the corresponding scan angle of the laser source. In other words, a timestamp may represent an association between the values of parameters q and β.

In one embodiment, when multiple light spots are imaged by the same pixel, the distance may be calculated using one light spot only, for example, the earliest-received light spot, while ignoring all subsequently-received light spots at the same pixel. Thus, in this embodiment, the timestamp of the earliest-received light spot may be treated as the pixel-specific output for the corresponding pixel. Alternatively, in another embodiment, the distance may be calculated for the light spot that is received the last in time, while ignoring all other light spots imaged by the same pixel. In either case, any light spot received between the first or the last light spot may be ignored for depth calculations. Mathematically, the scan times of light spots projected by a light source may be given as $t(0), t(1), \ldots, t(n)$, in which $t(i+1)-t(i)=d(t)$ (constant). The pixel/column outputs may be given as $a(0), a(1), \ldots, a(n)$, which are timestamps for the ON events and $a(i)$ is always after $t(i)$, but before $a(i+1)$. If $a(i)$ and $a(k)$ ($i \neq k$) happen to be associated with the same pixel/column, only one of them may be saved as discussed before to remove any ambiguity in depth calculations. Based on the time relationship between the scan time and the output time (represented by timestamps), the processing unit, such as the digital block 167, can determine which output point(s) is missing. Although the processing unit may not be able to recover the missing location, the depth calculations from the available output points may suffice to provide an acceptable 3D-depth profile of the object. Additional approaches to solve the problem of missing timestamps or outlier timestamps are discussed later below with reference to the discussion of FIGS. 9-11. It is noted here that, in one embodiment, it also may be possible for two different pixels to image a respective portion of the same light spot. In that embodiment, based on the closeness of the values of the timestamp outputs from these two pixels, the processing unit may infer that a single light spot may have been imaged by two different pixels. To resolve any ambiguity, the processing unit may use the timestamps to find an "average" of the respective location values q, and use that average value of q in Equation (1) to calculate the 3D depth for such "shared" light spot.

It is observed from the foregoing discussion that the timestamp-based 3D-depth measurement using triangulation according to particular embodiments of the present disclosure allows an ADC to be operated as a binary comparator with a low resolution of just a single bit, thereby consuming significantly less switching power in the ADC and, hence, conserving the system power. A high bit resolution ADC in traditional 3D sensors, on the other hand, may require more processing power. Furthermore, timestamp-based ambiguity resolution may also save system power in comparison with traditional imaging approaches that require significant processing power to search and match pixel data to resolve ambiguities. The latency is reduced as well because all depth measurements may be performed in one pass due to imaging/detection of all point-scanned light spots in a single imaging step. In particular embodiments, each pixel in the pixel array may be a single storage pixel and, hence, can be made as small as 1 micrometer (μm) in size. In a single storage pixel design, there may be only one photodiode and one junction capacitor per pixel (like the transistor 111 in FIG. 6) to integrate and store photoelectrons. On the other hand, a pixel that has one photodiode with multiple capacitors to store photoelectrons coming at different times may not be reduced to such a small size. Thus, the low-power 3D imaging system with small sensors as per particular embodiments of the present disclosure may facilitate its easy implementation in mobile applications such as in cameras in smartphones or tablets.

As mentioned before, the same image sensor, such as the image sensor unit 24 in FIGS. 1 and 2—may be used for both 2D-imaging and 3D-depth measurements according to one embodiment of the present disclosure. Such a dual-mode image sensor may be, for example, but not limited to, part of a camera system on a mobile phone, smartphone, laptop computer, or tablet, or as part of a camera system in an industrial robot or VR equipment. In particular embodiments, there may be a mode switch on the device to allow a user to select between the traditional 2D-camera mode or the 3D-imaging mode using depth measurements as discussed before. In the traditional 2D-camera mode, in particular embodiments, the user may capture color (RGB) images or snapshots of a scene or a particular 3D object within the scene. However, in the 3D mode, the user may be able to generate a 3D image of the object based on the camera system performing the point scan-based depth measurements in the manner discussed earlier. In either mode, the same image sensor may be used in its entirety to carry out the desired imaging. In other words, each pixel in the image sensor may be used for either application, 2D or 3D imaging.

As also mentioned before, a timestamp may be used to find correspondence between the following two parameters given in Equation (1): the pixel location q of an imaged light spot, and the corresponding scan angle β of the laser source. Thus, a jitter or error in a timestamp may reduce the minimum resolvable time (or time resolution) of the timestamp. This, in turn, may reduce the number of laser spots that can be scanned within one row time, which may result in the reduction of the frame rate and spatial resolution of the depth image. For example, pixel charge collection and subsequent processing may reduce the speed with which timestamps may be generated. In particular embodiments, the timestamp generation may take several microseconds, whereas laser scanning may be performed significantly faster, for example, in nanoseconds. Thus, an error or jitter in one or more timestamps may result in further processing delays, and may also require a slower laser scan to accommodate the time needed to rectify timestamp errors or to generate error-free timestamps. Assuming that the same time is allotted to scan each row on the 3D object, the requirement to reduce the speed of the laser scan may result in a reduced number of laser spots that can be scanned along one row of pixels in the given scan duration. This may, in turn, reduce the spatial resolution of the 3D-depth image of the object.

Errors in timestamps may reduce the minimum resolvable time (i.e., the time resolution) in the timestamps. One source of timestamp errors may be caused by weak light signals that have been reflected from surfaces having low reflectivity and/or from surfaces located at great distances from the 2D pixel array 42. Such weak light signals may produce a pixel-specific output that does not exceed the threshold set by, for example, the RAMP input 143. There may also be other reasons for weak light signals being received by the 2D pixel array. For example, the comparators that compare the pixel-specific outputs to the threshold set by the RAMP input 143 may drift and/or may have a high input offset. Power-supply fluctuations and random noise may also cause a timestamp for a pixel-specific output to not be generated. If a timestamp for a pixel-specific output is not generated for whatever reason, the timestamp is considered to be missing. Missing timestamps reduce the number of light spots that can be scanned within one row time, and reduces the frame rate and spatial resolution of a depth image.

Under normal conditions in which received light spots are sufficiently strong to produce a pixel-specific output that exceeds the threshold set by, for example, the RAMP input 143, so that timestamps are not missing, each pixel-specific output in a row of pixels has a corresponding timestamp value, and the timestamp values associated with a row of pixels are monotonically increasing or decreasing depending on the direction the sequence of light spots are scanned for the row. There may be instances, as described above, in which weak light signals reflected from a surface may cause no timestamp to be generated. That is, there may be instances in which weak light signals reflected from a surface may cause one or more missing timestamps.

There may also be instances in which the reflected light from a single light spot is imaged by multiple adjacent pixels in a pixel row, in which case the multiple adjacent pixels all have timestamps having about the same value. Such an arrangement of multiple adjacent pixels that image the same light spot and have the same or about the same timestamp is referred to herein as a "pixel cluster." In yet other instances, the circumstances might be that a timestamp associated with non-monotonic in that the corresponding pixel-specific output is sequentially located in a row with respect to other adjacent pixel-specific outputs, but the timestamp value is not monotonic with respect to the timestamp values of the adjacent pixel-specific outputs. Such a pixel-specific non-monotonic timestamp may be referred to herein as an "outlier." In any of these situations, the monotonic relationship of timestamp values of a pixel row does not exist and determining which pixel-specific output best corresponds to the light spot based on only the timestamp values may be difficult, which may lead to timestamp errors caused by missing timestamps and/or pixel clusters.

Figure 9:
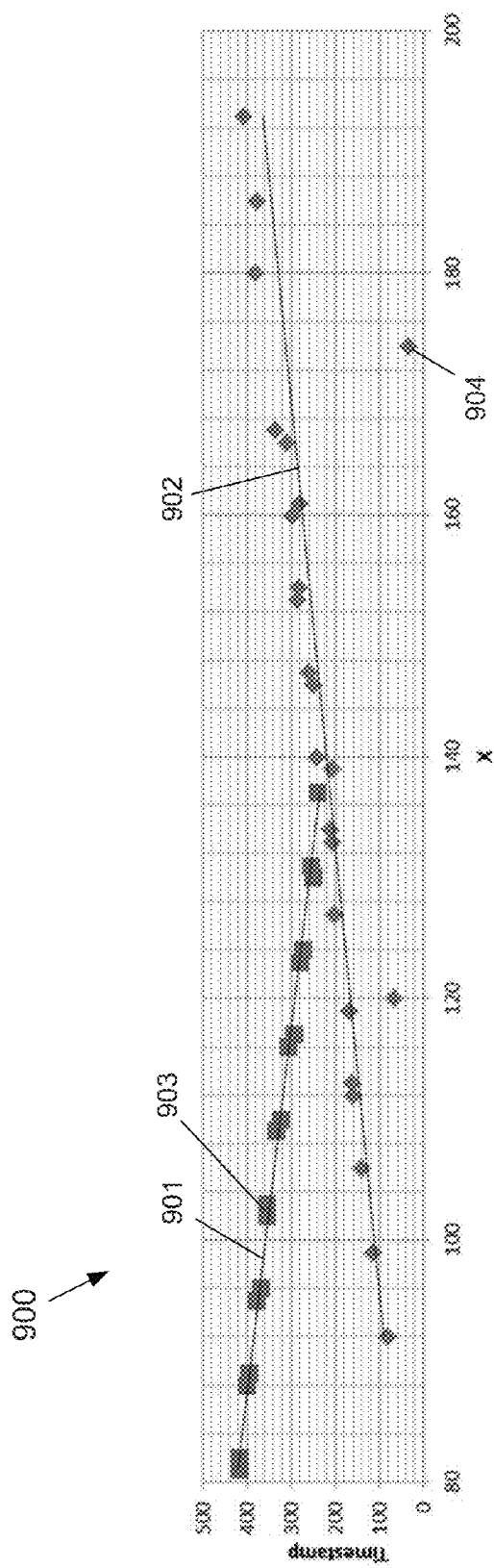
FIG. 9 is a graph depicting pixel-specific outputs from two example rows of pixels of a two-dimensional array of pixels.

For example, FIG. 9 is a graph 900 depicting pixel-specific outputs from two example rows of pixels of a two-dimensional array of pixels. The abscissa of graph 900 represents pixel positions x along a row of pixels in the two-dimensional array of pixels, and the ordinate of graph 900 represents timestamp values in arbitrary units. One row of pixel-specific outputs, indicated as 901, depicts pixel-specific outputs (indicated by square-shaped points) from a row in which the scan line of light spots is from left to right, whereas another row of pixel-specific outputs, indicated as 902, depicts pixel-specific outputs (indicated by diamond-shaped points) from a row in which the scan line of light spots is from right to left. The reversal in direction is the result of the reflection of the light spots.

For the pixel-specific outputs of row 901, the reflected light becomes weaker as the light spots are scanned along the scan line, and the pixel-specific outputs for pixels to the right of pixel position 140 are too weak to generate a timestamp. Thus, the pixel-specific output for the pixels to the right of pixel position 140, the timestamps are missing. While row 901 has a number of sequentially missing timestamps, it should be understood that a missing timestamp may be a single missing timestamp. Additionally, both rows 901 and 902 in FIG. 9 have pixel-specific timestamps that are to varying degrees exhibit pixel clusters. One example pixel cluster, indicated at 903, represents two pixel-specific outputs that both have the same timestamp value, but have different pixel positions in the pixel row. Other pixel clusters (not shown) may include more numbers of pixel-specific outputs. Lastly, pixel-specific output 904 represents an outlier in which the timestamp value is not monotonic with respect to adjacent or neighboring pixel-specific outputs, although the pixel position is consistent with the pixel position of the adjacent or neighboring pixel-specific outputs To correct errors caused by missing timestamps, the subject matter disclosed herein utilizes a double-readout technique to generate timestamps and grayscale values for each pixel-specific output. That is, for a pixel-specific output that exceeds the threshold set by, for example, the RAMP input 143, both a timestamp value and a grayscale value are generated and associated with the pixel-specific output. In instances in which a pixel-specific output does not exceed the threshold set by, for example, the RAMP input 143 and no timestamp is generated (i.e., a missing timestamp) or an outlier timestamp is generated, a grayscale value for the pixel-specific output is generated and associated with the pixel-specific output. The double-readout technique disclosed herein may be used to correct errors caused by missing timestamps, timestamps associated with pixel clusters and eliminate outlier timestamps, i.e., timestamps associated with pixel-specific outputs in which the timestamp values are not consistent with the monotonic relationship of timestamp values under normal conditions.

Figure 10:
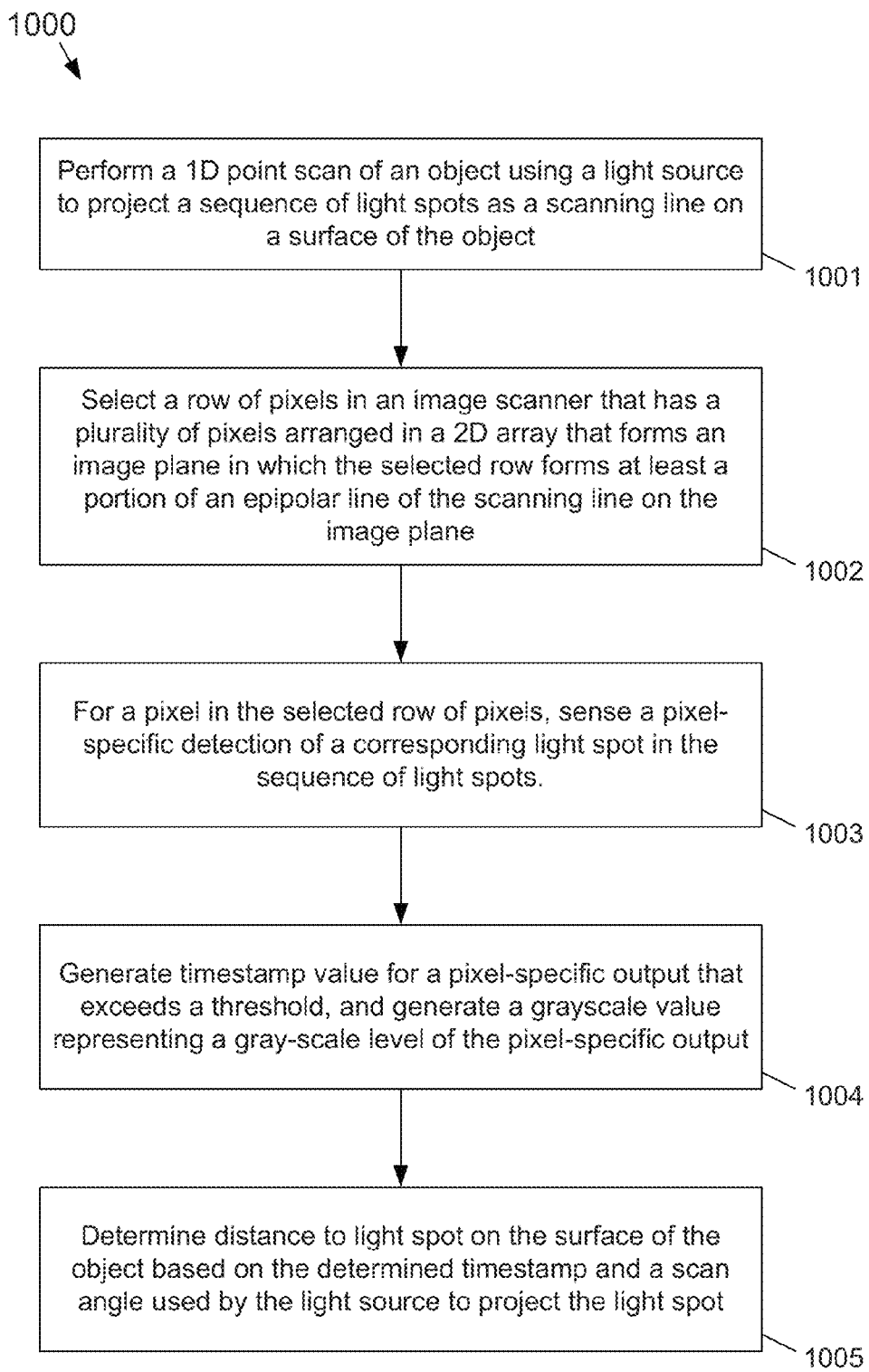
FIG. 10 shows an exemplary flowchart depicting a double-readout technique that may be used for timestamp error correction during 3D-depth measurements according to an embodiment of the present disclosure.

FIG. 10 shows an exemplary flowchart 1000 depicting a double-readout technique that may be used for timestamp error correction during 3D-depth measurements according to an embodiment of the present disclosure. As in the embodiment depicted in FIG. 3, various operations illustrated in FIG. 10 may be performed by a single module or a combination of modules and/or system components in the system 15. In the discussion herein, by way of an example only, specific tasks are described may be performed by specific modules and/or system components. Other modules and/or system components, however, may be suitably configured to perform such tasks as well.

In FIG. 10, the operation at block 1001 may be similar to the operation at block 52 in FIG. 3. In other words, at block 1001 in FIG. 10, the system 15 (more specifically, the processor 19) may perform a 1D point scan of a 3D object, such as the object 26 in FIG. 2, along a scanning line using a light source, such as the light source module 22 in FIG. 2. As part of the point scan, the light source module 22 may be configured, for example, by the processor 19, to project a sequence of light spots on a surface of the 3D object 26 in a line-by-line manner.

At block 1002, the pixel processing unit 46 in the system 15 may select a row of pixels in an image sensor, such as the 2D-pixel array 42 shown in FIG. 2. The image sensor 42 may have a plurality of pixels arranged in a 2D array that forms an image plane and, in one embodiment the selected row of pixels forms at least a portion of an epipolar line of the scanning line on the image plane.

At block 1003, for a pixel in the selected row of pixels, the pixel processing unit 46 may be operatively configured by the processor 19 to sense a pixel-specific detection of a corresponding light spot in the sequence of light spots. As mentioned previously, in one embodiment, such "sensing" may refer to activation of the pixel for collection of the charge generated by the photodiode of a sensor if the photodiode detects luminance received from the corresponding light spot. The pixel-specific PIXOUT signal may represent such pixel-specific charge generated in response to received luminance.

At block 1004 the pixel processing unit 46, as suitably configured by the processor 19, may generate a timestamp value for the corresponding light spot and a grayscale value representing a gray-level intensity of the pixel-specific output. More specifically, the pixel processing unit 46 is configured to generate both timestamps and grayscale values for each pixel-specific output. In the instance in which a pixel-specific output that exceeds the threshold set by, for example, the RAMP input 143, both a timestamp value and a grayscale value are generated and associated with the pixel-specific output. In instances in which a pixel-specific output does not exceed the threshold set by, for example, the RAMP input 143, no timestamp is generated and a grayscale value for the pixel-specific output is generated and associated with the pixel-specific output. Thus, a grayscale value representing a gray-level intensity of the pixel-specific output is generated regardless whether the predetermined threshold is exceeded by the pixel-specific output. In instances in which a single pixel-specific output corresponds to a light spot (i.e., a normal condition), both a timestamp and a grayscale value are generated and associated with the pixel-specific output. There is no missing timestamp and the timestamp associated with the single pixel-specific output will be used to determine a distance to the light spot. In instances in which there is more than one pixel-specific output for a light spot (i.e., pixel cluster), the timestamp that will be determined for the light spot may be the timestamp corresponding to the greatest gray-scale value of the pixel cluster. In instances in which there is a missing timestamp for a light spot, the timestamp for the light spot may be determined by interpolating the timestamp values associated with neighboring light spots of the sequence of light spots. As described in connection with FIGS. 7B and 8, a column-specific correction value may be applied to generated timestamp values to obtain column-specific corrected timestamp values.

At block 1005 in FIG. 10, the image processing unit 46 may determine the 3D distance (or depth) to the corresponding light spot on the surface of the 3D object based at least on the determined timestamp value for the light spot and on a scan angle used by the light source to project the corresponding light spot. In instances in which a single pixel-specific output corresponds to a light spot (i.e., a normal condition), the determined timestamp value for the light spot used at block 1005 to determine the 3D distance is the timestamp value associated with the single pixel-specific output. In instances in which there is more than one pixel-specific output for a light spot (i.e., pixel cluster), the determined timestamp value for the light spot used at block 1005 to determine the 3D distance is the timestamp value corresponding to the greatest gray-scale value of the pixel-specific outputs of the pixel cluster. In instances in which there is a missing timestamp for a light spot, the determined timestamp value for the light spot used at block 1005 is an interpolated value that is based on the timestamp values associated with light spots in the sequence of light spots that are neighbors to the light spot. In some cases, the neighboring light spots may be directly adjacent to the light spot for which the timestamp is being determined. In other cases, such as may be the case for pixel clusters, the neighboring light spots may not be directly adjacent to the light spot for which the timestamp is being determined. As previously noted, a determined timestamp value provided by the double-readout technique disclosed herein that reduced timestamp errors may provide the needed correspondence between the pixel location q of an imaged light spot and the corresponding scan angle θ of the laser source. The determined timestamp value, the pixel location q and the corresponding scan angle θ and other parameters may be used in Equation (1) for a triangulation-based depth measurement, such as depicted in FIG. 4.

FIG. 11 depicts a timing diagram 1100 that shows exemplary timing of different signals for a double-readout technique that may be used in, for example, the system 15 of FIGS. 1 and 2 according to the subject matter disclosed herein. The double-readout technique disclosed herein generates timestamp values and grayscale values representing gray-scale intensities for pixel-specific outputs. Initially, timestamp values are generated, then grayscale values are generated. With reference to FIG. 11, timestamp values are generated during a first portion 1101 and grayscale values representing gray-scale intensities are generated during a second portion 1102.

As noted previously, in particular embodiments, all pixels in the same image sensor 24 in the system 15 may be used for 2D as well as 3D imaging. An object 26 may be point-scanned one spot at a time by the laser light source 33 along a row R 75 of the pixel array 42, in which R is known based on its epipolar relation with the scanning line $S_R$ 66. After scanning one row, the scanning operation repeats with another row. When the laser projects a next spot, the earlier-projected light spot may be imaged by the corresponding pixel in row R 75. The timestamps and grayscale values for the pixel-specific outputs generated from all the pixels in row R by the double-readout technique disclosed herein may be read out to the depth processing circuit/module in the digital processing block 167 (FIG. 7A).

To generate a timestamp value and a grayscale value for a pixel-specific output, the corresponding row may be initially selected using an RSEL signal 122. In the context of FIG. 11, it is assumed that the row decoder/driver 116 in, for example, FIG. 6 selects the row of pixels containing pixels 106-108 by asserting the RSEL signal 122 to a "high" level as shown in FIG. 11. Thus, all the pixels 106-108 are selected together. For ease of discussion, the same reference numerals are used in FIG. 11 for the signals, inputs and outputs that are shown in FIGS. 6-7. Initially, all the pixels 106-108 in the selected row may be reset to a high voltage using the RST line 128. The "reset" level of a pixel may represent an absence of the pixel-specific detection of a corresponding light spot. In the 3D mode according to one embodiment, the RST signal 128 may be released from its high level for a predetermined time to facilitate integration of photoelectrons received by the pixels 106-108s to obtain the corresponding pixel output (pixout) signals 117-119, two of which (PIXOUT1 and PIXOUT2) are shown in FIG. 11 and discussed later below. The PIXOUT1 signal 119 represents the output supplied to a corresponding ADC unit by the pixel 108. The PIXOUT2 signal 118 represents the output supplied to a corresponding ADC unit by the pixel 107. In one embodiment other RST lines, like the lines 129-130 in FIG. 6, may remain high or "on" for unselected rows to prevent blooming. It is noted here that, strictly speaking, the PIXOUT signals 118 and 119 in FIG. 11 may be slightly modified by a CDS unit, such as the CDS unit 176 in FIG. 7B, before being applied as PIX_CDS signals to the first OTA, like the OTA 177 in FIG. 7B in a respective column-specific ADC unit, such as the ADC unit 175 in FIG. 7B. For the simplicity of illustration and ease of discussion, however, the PIXOUT signals in FIG. 11 are treated as representatives of respective PIX_CDS signals (not shown) and are considered as having been directly "input" to the respective OTAs 177.

After reset, when a photodiode in a pixel receives incident luminance, such as the photoelectrons in the light reflected from a light spot projected on the surface of the 3D object 26, the photodiode may generate a corresponding photocurrent. A detection of incident light by a pixel may be called an "ON event," whereas a decrease in the intensity of incident light or no detection of incident light may produce an "OFF event." The photocurrent generated in response to an ON event may decrease the pixel output voltage (PIXOUT) from its initial reset level. A pixel thus functions as a transducer to convert received luminance/light signal into a corresponding electrical (analog) voltage, which is generally designated as a PIXOUT signal in FIG. 11. Each pixel may be read individually and may be read in the sequence in which the corresponding light spots are projected by the laser source. The analog PIXOUT signal may be converted to a digital value by the corresponding column ADC. In the 2D-imaging mode, the ADC may function as an analog-to-digital converter and generate a multi-bit output. As discussed elsewhere herein, in the 3D-depth measurement mode, the ADC may, however, function as a time-to-digital converter (TDC) and generate a timestamp value representing the time when a light spot is detected by a pixel.

Referring again to FIG. 11, after the pixel reset is done (with RST 128 high), the column ADCs associated with pixels 106-108 may be reset as well before the RST 128 is released. The transfer (TX) signal 132 may, however, remain high throughout. The ADCs may be reset using either a common ADC reset signal or individual ADC-specific reset signals. In the embodiment of FIG. 11, a common ADC_RST signal 192 is shown to have been briefly asserted (to a high level) to reset the column-specific ADCs, like the ADC 175, in the column ADC unit 153 (FIG. 7A). In one embodiment, the ADCs may be reset to a pre-determined binary value, such as a binary "0" or other known number, after the pixels are reset. In FIG. 11, these reset values for ADCs associated with pixels 108 and 107 are respectively shown by "fields" 194 and 195 in the signals ADCOUT1 (or ADC output "A") and ADCOUT2 (or ADC output "B"). As used herein, the term "field" is used for convenience when discussing the ADC outputs shown in FIG. 11. It should be understood that an ADC output may not actually include all of such "fields" at the same time, but may be a specific digital value depending on the current stage of signal processing of the ADC. If the ADC is reset, its output may be a binary "0." If the ADC is triggered to count clock pulses, the output of the ADC may be a count value as in case of the 3D-depth measurements in FIG. 11; or if the ADC is used for 2D-color imaging, then the output of the ADC may be a multi-bit value representing an image signal. Thus, the ADC output signals in FIG. 11 are depicted with such "fields" merely to depict different digital values an ADC may internally generate in progressing toward the final output. In FIG. 11, the reference numeral 197 is used to refer to the ADCOUT1 signal representing the output of the ADC associated with the pixel 108, and the reference numeral 198 is used to refer to the ADCOUT2 signal representing the output of the ADC associated with the pixel 107. Each of the outputs 197 and 198 may appear as the Dout signal 140 (FIGS. 6-7) when the respective ADC is selected by the column decoder during memory readout. Prior to being reset, the ADC outputs 197 and 198 may have unknown values, as indicated by the notation "x" in the fields 199 and 200.

After the ADCs have been reset, a predetermined threshold value may be enabled by de-asserting the ramp input (Vramp) 143 to a predefined voltage level after the pixel reset RST signal 128 and ADC reset signal 192 have been released. In the embodiment of FIG. 11, the RAMP input 143 is common to all column-specific ADCs, thereby providing the same Vramp voltage to each ADC. In other embodiments, however, different Vramp values may be applied to two or more ADCs through separate, ADC-specific ramp inputs. Furthermore, in particular embodiments, the Vramp threshold may be a programmable parameter, allowing the Vramp threshold to be variable as desired. After the Vramp threshold signal has been enabled, the pixel-specific ADCs may wait for the corresponding pixel's "ON event" before starting their binary counters, like the counter 181 in FIG. 7B.

In the 3D-depth measurement mode, each ADC may generate a single-bit output (representing binary "0" or "1"), as opposed to a multi-bit output in case of the 2D imaging mode. Thus, in case of an RGB sensor, any color information received by a pixel in the RGB pixel array 42 may be effectively ignored in the 3D mode. In the absence of any incident light detected by a pixel, the corresponding ADCOUT signal may remain at the binary "0" value. Thus, columns without any ON events may continue to have digital value "0" (or other known number) for their respective ADCOUT signals. As noted before, when a pixel is hit with incident light, its PIXOUT line may start to droop from its reset level, as indicated by the downward slopes of the PIXOUT1 and PIXOUT2 signals in FIG. 11. Assuming that pixel charge is read starting with the pixel that receives the charge first, such a reading may start with the right-most pixel in a row and end with the left-most pixel as shown, for example, in FIG. 5, in which $t_1$ is the earliest time instant and $t_4$ is the latest one. Thus, in the embodiment of FIG. 11, the output of the pixel 108 (PIXOUT1) may be read before that of the pixel 107 (PIXOUT2). As soon as the progressively-drooping PIXOUT1 reaches the Vramp threshold 143, the single-bit ADCOUT1 may flip from binary "0" to binary "1." Instead of outputting the bit "1," the corresponding ADC may, however, record the time when the bit flips (from "0" to "1"). In other words, the ADC associated with the pixel 108 may function as a time-to-digital converter, by starting the binary counter in the ADC, as indicated by the "up count" field 202 in ADCOUT1. During the "up count" period, the counter in the ADC may count the clock pulses in the CLK signal (not shown), which may be applied to each ADC as shown, for example, in FIG. 7B. The counted clock pulses are shown by the Counter Clock 1 signal 204 in FIG. 11, and the counted value (in the "up count" field) may be provided as a pixel-specific output for the pixel 108. A similar counting may occur at the ADC associated with pixel 107 for the charge collected by the pixel 107, as indicated by the Counter Clock 2 signal 205 in FIG. 11. The pixel-specific counted value (in the "up count" field 207) may be provided by the respective ADC as a timestamp for the pixel-specific output for the pixel 107. All ADC-based counters may stop simultaneously, such as when the ramp signal 143 is asserted again after a predetermined time period has elapsed. In FIG. 11, the transition of the ramp signal 143 marking the conclusion of the pre-determined time period for pixel charge integration is indicated by line 210.

After the timestamps values have been generated for the pixel-specific outputs, the grayscale values for the pixel-specific outputs may be generated. The TX signal 132 may be de-asserted, and the ADC_RST signal 192 may be briefly asserted again to reset the ADCs. The PIXOUT1 signal 119 and the PIXOUT2 signal 118, for example, remain applied to the input of the ADCs, and after the ADC_RST signal 192 has been de-asserted, the RAMP signal 143 changes level at a predetermined rate, while the ADCs may count the clock pulses in the CLK signal (not shown), which may be applied to each ADC as shown, for example, in FIG. 7B. At the point in which the RAMP signal 143 equals the levels of, for example, the PIXOUT1 signal 119 at 1104 and the PIXOUT2 signal 118 at 1105, the corresponding ADCs stop counting the clock pulses. As depicted in FIG. 11, the count values in field 1120 and field 1121 respectively represent a grayscale value for the PIXOUT1 signal 119 and the PIXOUT2 signal 118. At 1131, the RST signal 128 is asserted and then de-asserted at 1132, after which the gray-scale values of PIXOUT1 signal 119 and PIXOUT2 signal 118 are respectively converted in digital numbers at 1133 and 1134.

After scanning all pixels in one row, as described above, the double-readout technique may repeat with another row, while the timestamps and grayscale values for the pixel-specific outputs from the earlier-scanned row are read out to the depth calculation unit in the digital block 167.

Figure 12:
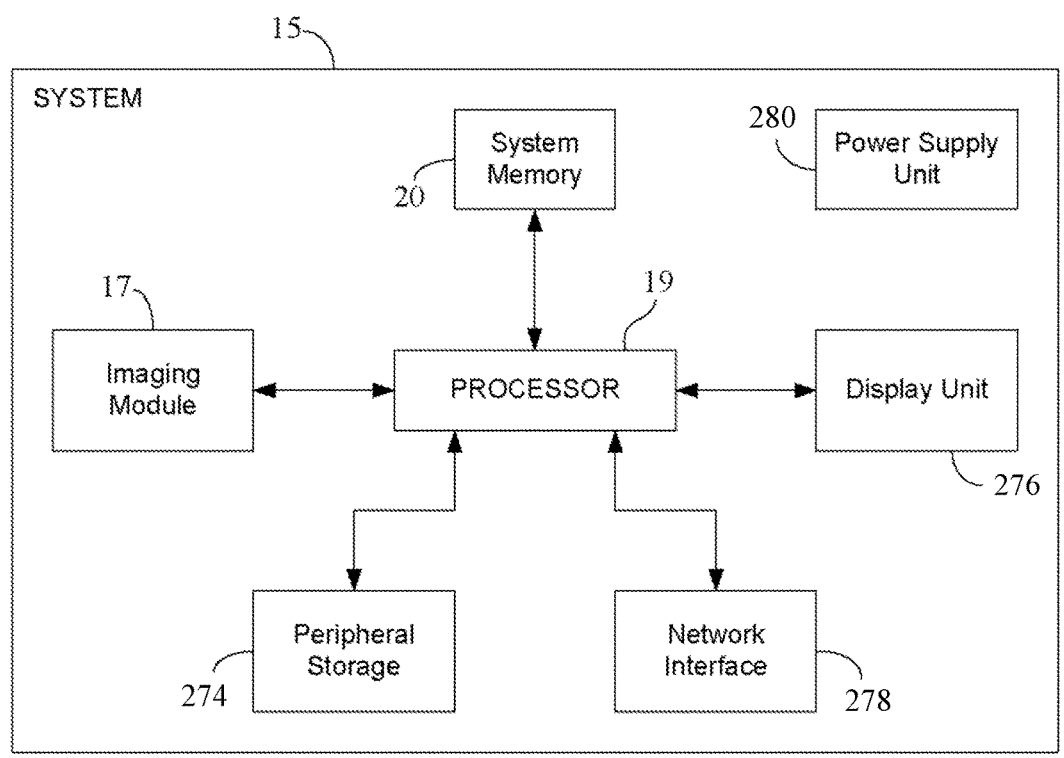
FIG. 12 depicts an overall layout of the system 15 in FIGS. 1 and 2 according to one embodiment of the present disclosure.

FIG. 12 depicts an overall layout of the system 15 in FIGS. 1 and 2 according to one embodiment of the present disclosure. Hence, for ease of reference and discussion, the same reference numerals are used in FIGS. 1 and 2 and 12 for the common system components/units.

As discussed earlier, the imaging module 17 may include the hardware shown in the exemplary embodiments of FIGS. 2, 6, 7A and 7B to accomplish 2D imaging, 3D-depth measurements, and timestamp calibration as per the inventive aspects of the present disclosure. The processor 19 may be configured to interface with a number of external devices. In one embodiment, the imaging module 17 may function as an input device that provides data inputs (i.e., in the form of pixel event data such as the processed data output 170 in FIG. 7A) to the processor 19 for further processing. The processor 19 may also receive inputs from other input devices (not shown) that may be part of the system 15. Some examples of such input devices include a computer keyboard, a touchpad, a touch-screen, a joystick, a physical or virtual "clickable button," and/or a computer mouse/pointing device. In FIG. 12, the processor 19 is shown coupled to the system memory 20, a peripheral storage unit 274, one or more output devices 276, and a network interface unit 278. In FIG. 12, a display unit is shown as an output device 276. In some embodiments, the system 15 may include more than one instance of the devices shown. Some examples of the system 15 include, but is not limited to, a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a vehicle dash-cam or rearview camera system, or any other type of computing or data processing device. In various embodiments, all of the components shown in FIG. 12 may be housed within a single housing. Thus, the system 15 may be configured as a standalone system or in any other suitable form factor. In some embodiments, the system 15 may be configured as a client system rather than a server system.

In particular embodiments, the system 15 may include more than one processor (e.g., in a distributed processing configuration). When the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Units (CPUs).

As mentioned earlier, the system memory 20 may be any semiconductor-based storage system such as DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data storage medium.

The peripheral storage unit 274, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, and the like. In some embodiments, the peripheral storage unit 274 may include more complex storage devices/systems such as disk arrays (which may be in a suitable RAID (Redundant Array of Independent Disks) configuration) or Storage Area Networks (SANs), and the peripheral storage unit 274 may be coupled to the processor 19 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 276 may be an example of an output device. Other examples of an output device include a graphics/display device, a computer screen, an alarm system, a CAD/CAM (Computer Aided Design/Computer Aided Machining) system, a video game station, a smartphone display screen, or any other type of data output device. In some embodiments, the input device(s), such as the imaging module 17, and the output device(s), such as the display unit 276, may be coupled to the processor 19 via an I/O or peripheral interface(s).

In one embodiment, the network interface 278 may communicate with the processor 19 to enable the system 15 to couple to a network (not shown). In another embodiment, the network interface 278 may be absent altogether. The network interface 278 may include any suitable devices, media and/or protocol content for connecting the system 15 to a network, whether wired or wireless. In various embodiments, the network may include Local Area Networks (LANs), Wide Area Networks (WANs), wired or wireless Ethernet, telecommunication networks, or other suitable types of networks.

The system 15 may include an on-board power supply unit 280 to provide electrical power to various system components illustrated in FIG. 12. The power supply unit 280 may receive batteries or may be connectable to an AC electrical power outlet. In one embodiment, the power supply unit 280 may convert solar energy or other renewable energy into electrical power.

In one embodiment, the imaging module 17 may be integrated with a high-speed interface such as a Universal Serial Bus 2.0 or 3.0 (USB 2.0 or 3.0) interface or above, that plugs into any Personal Computer (PC) or laptop. A non-transitory, computer-readable data storage medium, such as the system memory 20 or a peripheral data storage unit such as a CD/DVD may store program code or software. The processor 19 and/or the digital processing block 167 (FIG. 7A) in the imaging module 17 may be configured to execute the program code, whereby the device 15 may be operative to perform the 2D imaging and 3D-depth measurements (and related timestamp calibration) as discussed hereinbefore, such as the operations discussed earlier with reference to FIGS. 1-11. For example, in certain embodiments, upon execution of the program code, the processor 19 and/or the digital block 167 may suitably configure (or activate) relevant circuit components, such as the calibration unit 171 and the readout chain 175 to appropriately carry out the timestamp calibration as per teachings of the present disclosure with the help of those components. The program code or software may be proprietary software or open source software which, upon execution by the appropriate processing entity, such as the processor 19 and/or the digital block 167, may enable the processing entity to perform timestamp calibration, capture pixel events using their precise timing, process them, render them in a variety of formats, and display them in the 2D and/or 3D formats. As noted earlier, in certain embodiments, the digital processing block 167 in the imaging module 17 may perform some of the processing of pixel event signals before the pixel output data are sent to the processor 19 for further processing and display. In other embodiments, the processor 19 may also perform the functionality of the digital block 167, in which case, the digital block 167 may not be a part of the imaging module 17.

In the preceding description, for purposes of explanation and not limitation, specific details are set forth (such as particular architectures, waveforms, interfaces, techniques, etc.) in order to provide a thorough understanding of the disclosed technology. It will, however, be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted to not obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as any elements developed that perform the same function, regardless of structure.

Thus, for example, it will be appreciated by those skilled in the art that block diagrams herein (e.g., in FIGS. 1 and 2) can represent conceptual views of illustrative circuitry or other functional units embodying the principles of the technology. Similarly, it will be appreciated that the flowcharts in FIGS. 3 and 10 represent various processes which may be substantially performed by a processor (e.g., the processor 19 in FIG. 12 and/or the digital block 167 in FIG. 7A). Such processor may include, by way of example, a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-12 also may be provided by such processor, in the hardware and/or software.

When certain inventive aspects require software-based processing, such software or program code may reside in a computer-readable data storage medium. As noted earlier, such data storage medium may be part of the peripheral storage 274, or may be part of the system memory 20 or any internal memory (not shown) of the image sensor unit 24, or the internal memory (not shown) of the processor 19. In one embodiment, the processor 19 or the digital block 167 may execute instructions stored on such a medium to carry out the software-based processing. The computer-readable data storage medium may be a non-transitory data storage medium containing a computer program, software, firmware, or microcode for execution by a general-purpose computer or a processor mentioned above. Examples of computer-readable storage media include, but are not limited to, a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the imaging module 17 or the system 15 comprising such an imaging module according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various 2D- and 3D-imaging functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method, comprising:
    performing a one-dimensional point scan of an object along a scanning line using a light source, the point scan projecting a sequence of light spots on a surface of the object;
    selecting a row of pixels in an image sensor, the image sensor comprising a plurality of pixels arranged in a two-dimensional array forming an image plane, and the selected row of pixels forming at least a portion of an epipolar line of the scanning line on the image plane;
    generating at least one pixel-specific output of a pixel in the selected row corresponding to a light spot in the sequence of light spots;
    generating a timestamp value associated with each pixel-specific output corresponding to the light spot if the pixel-specific output corresponding to the light spot exceeds a predetermined threshold;
    generating a grayscale value representing a gray-level intensity of each pixel-specific output corresponding to the light spot;
    determining a timestamp value for the light spot as:
        the timestamp value that corresponds to a pixel-specific output having the greatest gray-level intensity corresponding to the light spot if more than two pixel-specific outputs correspond to the light spot and at least one pixel-specific output exceeds the predetermined threshold, or
        a timestamp value that is based on timestamps associated with pixel-specific outputs corresponding to light spots in the sequence of light spots that are neighbors to the light spot if a pixel-specific output corresponds to the light spot and no timestamp or an outlier timestamp was generated for the light spot; and
    determining a distance to the light spot on the surface of the object based on the determined timestamp value for the light spot and a scan angle used by the light source to project the light spot.

2. The method according to claim 1, wherein determining the timestamp value for the light spot if only one single pixel-specific output corresponds to the light spot and no timestamp or an outlier was generated for the light spot further comprises determining the timestamp value for the light spot based on interpolating timestamps associated with pixel-specific outputs corresponding to light spots in the sequence of light spots that are neighbors to the light spot.

3. The method according to claim 2, wherein determining the timestamp value for the light spot further comprises the timestamp value associated with pixel-specific output corresponding to the light spot if only one pixel-specific output corresponds to the light spot and the pixel-specific output exceeds the predetermined threshold.

4. The method according to claim 1, wherein at least one pixel in the selected row of pixels comprises a Four Transistor (4T) pixel, a Three Transistor (3T) pixel, a Two Transistor (2T) pixel, a One Transistor (1T) pixel, a shared-transistor pixel, a 1×2 2-shared pixel, or a 1×4 4-shared pixel.

5. The method according to claim 1, wherein the light source comprises a laser light source, a visible laser light source, a point light source, a near infrared laser light source, or a monochromatic illumination source, and
    wherein the light source further comprises an X-Y addressable light source.

6. The method according to claim 1, wherein the two-dimensional pixel array comprises a Complementary Metal Oxide Semiconductor (CMOS) pixel array.

7. The method according to claim 1, wherein detecting each light spot comprises receiving at a pixel in the row of pixels light reflected from projection of one or more light spots on the object.

8. The method according to claim 1, wherein determining the distance to the corresponding light spot comprises:
    performing a triangulation-based calculation using the scan angle of the light source, an offset distance between the light source and collection optics associated with the image sensor, a distance between the collection optics and the two-dimensional array; and an offset distance between the collection optics and the pixel that detects the corresponding light spot.

9. An imaging unit, comprising:
    a light source to perform a one-dimensional point scan of an object along a scanning line, the point scan projecting a sequence of light spots on a surface of the object; and
    an image sensor unit comprising:
        a plurality of pixels arranged in a two-dimensional pixel array that forms an image plane, a row of pixels in the two-dimensional pixel array forming at least a portion of an epipolar line of the scanning line, and each pixel in the row of pixels to generate a pixel-specific output corresponding to a light spot in the sequence of light spots;
        an analog-to-digital converter to generate a timestamp value associated with each pixel-specific output corresponding to the light spot if the pixel-specific output exceeds a predetermined threshold, and
    to generate a grayscale value representing a gray-level intensity of each pixel-specific output corresponding to the light spot;
        a processor to determine a timestamp value for the light spot as:
            the timestamp value that corresponds to a pixel-specific output having the greatest gray-level intensity corresponding to the light spot if more than two pixel-specific outputs correspond to the light spot and at least one pixel-specific output exceeds the predetermined threshold, and
            a timestamp value that is based timestamps associated with pixel-specific outputs corresponding to light spots in the sequence of light spots that are neighbors to the light spot if a pixel-specific output corresponds to the light spot and no timestamp or an outlier timestamp was generated for the light spot, the processor to further determine a distance to the light spot on the surface of the object based on the determined timestamp value for the light spot and a scan angle used by the light source to project the light spot.

10. The image unit according to claim 9, wherein the processor further determines the timestamp value for the light spot by determining the timestamp value for the light spot based on interpolating timestamps associated with pixel-specific outputs corresponding to light spots in the sequence of light spots that are neighbors to the light spot if a pixel-specific output corresponds to the light spot and no timestamp or an outlier timestamp was generated for the light spot.

11. The image unit according to claim 10, wherein the processor to further determine the timestamp value for the light spot by determining the timestamp value to be the timestamp value associated with pixel-specific output corresponding to the light spot if only one pixel-specific output corresponds to the light spot and the pixel-specific output exceeds the predetermined threshold.

12. The image unit according to claim 9, wherein at least one pixel in the at least one row of pixels comprises a Four Transistor (4T) pixel, a Three Transistor (3T) pixel, a Two Transistor (2T) pixel, a One Transistor (1T) pixel, a shared-transistor pixel, a 1×2 2-shared pixel, or a 1×4 4-shared pixel.

13. The image unit according to claim 9, wherein the light source comprises a laser light source, a visible laser light source, a point light source, a near infrared laser light source, or a monochromatic illumination source, and wherein the light source further comprises an X-Y addressable light source.

14. The image unit according to claim 9, wherein the two-dimensional pixel array comprises a Complementary Metal Oxide Semiconductor (CMOS) pixel array.

15. The image unit according to claim 9, wherein each pixel in the row of pixels generates a pixel-specific output corresponding to a light spot by receiving at a pixel in the row of pixels light reflected from projection of one or more light spots on the object.

16. The image unit according to claim 9, wherein the processor determines the distance to the corresponding light spot based on a triangulation-based calculation using the scan angle of the light source, an offset distance between the light source and collection optics associated with the image sensor, a distance between the collection optics and the two-dimensional array; and an offset distance between the collection optics and the pixel that detects the corresponding light spot.

17. An image sensor unit, comprising:

a two-dimensional pixel array comprising a plurality of rows of pixels that forms an image plane, at least one row of pixels to generate a pixel-specific output corresponding to a light spot in a sequence of light spots projected in a scanning line on to a surface of an object, the at least one row forming at least a portion of an epipolar line of the scanning line;

an analog-to-digital converter to generate a timestamp value associated with each pixel-specific output corresponding to the light spot if the pixel-specific output exceeds a predetermined threshold, and to generate a grayscale value representing a gray-level intensity of each pixel-specific output corresponding to the light spot; and a processor to determine a timestamp value for the light spot as:

the timestamp value associated with pixel-specific output corresponding to the light spot if only one pixel-specific output corresponds to the light spot and the pixel-specific output exceeds the predetermined threshold, the timestamp value that corresponds to a pixel-specific output having the greatest gray-level intensity corresponding to the light spot if more than two pixel-specific outputs correspond to the light spot and at least one pixel-specific output exceeds the predetermined threshold, and a timestamp value that is based timestamps associated with pixel-specific outputs corresponding to light spots in the sequence of light spots that are neighbors to the light spot if a pixel-specific output corresponds to the light spot and no timestamp or an outlier time stamp was generated for the light spot, the processor to further determine a distance to the light spot on the surface of the object based on the determined timestamp value for the light spot and a scan angle used by the light source to project the light spot.

18. The image unit according to claim 17, wherein the processor further determines the timestamp value for the light spot if a single pixel-specific output corresponds to the light spot and no timestamp or an outlier timestamp was generated for the light spot by determining the timestamp value for the light spot based on interpolating timestamps associated with pixel-specific outputs corresponding to light spots in the sequence of light spots that are neighbors to the light spot.

19. The image unit according to claim 17, wherein at least one pixel in the at least one row of pixels comprises a Four Transistor (4T) pixel, a Three Transistor (3T) pixel, a Two Transistor (2T) pixel, a One Transistor (1T) pixel, a shared-transistor pixel, a 1×2 2-shared pixel, or a 1×4 4-shared pixel.

20. The image unit according to claim 17, wherein the processor determines the distance to the corresponding light spot based on a triangulation-based calculation using the scan angle of the light source, an offset distance between the light source and collection optics associated with the image sensor, a distance between the collection optics and the two-dimensional array; and an offset distance between the collection optics and the pixel that detects the corresponding light spot.

* * * * *